United States Patent
Komiya et al.

(10) Patent No.: US 8,280,178 B2
(45) Date of Patent: Oct. 2, 2012

(54) MOVING IMAGE RECEIVING APPARATUS

(75) Inventors: Daisaku Komiya, Kanagawa (JP); Yoshimasa Honda, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/275,639

(22) Filed: Oct. 18, 2011

(65) Prior Publication Data

US 2012/0063741 A1 Mar. 15, 2012

Related U.S. Application Data

(62) Division of application No. 12/065,223, filed as application No. PCT/JP2006/316026 on Aug. 14, 2006, now Pat. No. 8,073,273.

(30) Foreign Application Priority Data

Aug. 31, 2005 (JP) .................................. 2005-250758

(51) Int. Cl.
*G06K 9/36* (2006.01)

(52) U.S. Cl. ....................................................... 382/236

(58) Field of Classification Search .......... 382/232–233, 382/238; 348/394.1, 400.1–401.1, 409.1–415.1, 348/420.1–421.1; 375/240.12–240.15, 240.24
See application file for complete search history.

(56) References Cited

U.S. PATENT DOCUMENTS

| | | | |
|---|---|---|---|
| 5,220,325 A | 6/1993 | Ackland et al. | |
| 5,617,143 A | 4/1997 | Shimokoriyama et al. | |
| 2002/0018525 A1 | 2/2002 | Nishi et al. | |

FOREIGN PATENT DOCUMENTS

| | | |
|---|---|---|
| JP | 7-298231 | 11/1995 |
| JP | 9-284714 | 10/1997 |
| JP | 11-168729 | 6/1999 |
| JP | 2002-112275 | 4/2002 |

OTHER PUBLICATIONS

International Search Report issued Nov. 21, 2006 in the International (PCT) Application No. PCT/JP2006/316026.
International Preliminary Report on Patentability issued Mar. 13, 2008 in the International (PCT) Application No. PCT/JP2006/316026.

*Primary Examiner* — Jose Couso
(74) *Attorney, Agent, or Firm* — Wenderoth, Lind & Ponack, L.L.P.

(57) ABSTRACT

A moving image receiving apparatus has a moving image decoding apparatus (303) for decoding received moving image data. The moving image decoding apparatus (303) comprises: a media buffer (401) for storing moving image data; an intra-map memory (402) for storing an intra-map indicating a location of an intrablock included in an interframe of the moving image data; a pseudo intraframe generator (404) that, based on an intra-map stored in the intra-map memory (402), extracts an image of an intrablock included in an interframe in order from a latest interframe accumulated in the media buffer (401), combines images of intrablocks extracted from a plurality of interframes, and thereby generates a pseudo intraframe; and a decoder (406) that starts to decode moving image data, using a pseudo intraframe. The moving image receiving apparatus can thus decode received moving image data from an arbitrary frame.

2 Claims, 15 Drawing Sheets

FRAME n          FRAME n+1

MOVING IMAGE RECEIVING APPARATUS

This application is a Divisional of application Ser. No. 12/065,223, filed Feb. 28, 2008, now U.S.Pat. No. 8,073,273 which is the National Stage of International Application No. PCT/JP2006/316026, filed Aug. 14, 2006.

RELATED APPLICATIONS

This application claims the benefit of Japanese Patent Application No. 2005-250758 filed on Aug. 31, 2005 in Japan, the contents of which are incorporated herein by reference.

TECHNICAL FIELD

The present invention relates to a technique for decoding an encoded moving image, and specifically to a fast moving picture decoding technique for decoding, from any frame, an inter-frame compressed moving image encoded based on a temporal correlation.

BACKGROUND ART

In recent years, personal computers have spread widely even among ordinary households, and it has become easy to use a videophone by means of moving picture transmission, to edit a shot movie image, and to do the like. The start of terrestrial digital broadcasting and the spread of DVD (digital versatile disk) recorders and hard disk recorders have further popularized digital moving images.

A digital moving picture generally has an enormous amount of digital information, and is therefore usually compressed. A moving image compression standard, MPEG-2 (ISO/IEC13818-2 International Standard MPEG-2 Video) is used for the above-mentioned terrestrial digital broadcasting and DVD recorders. A moving image compression standard, ITU-T H.263 is often used for videophones.

MPEG standards and many other moving image compression standards incorporate inter-frame compression techniques that exploit the temporal redundancy in successive image frames. Those techniques focus on the fact that successive frames are highly correlated with each other over such a short time as 30 frames per second. In concrete terms, one specific frame is encoded by using only information in the frame; and a frame following the frame is encoded by obtaining a difference frame that is a difference between the following frame and the preceding frame. A frame that is encoded by using only information in the frame is called an intra-frame encoded frame or an intraframe. An encoded following frame is called an inter-frame encoded frame or an interframe, since it is encoded by using a preceding frame.

At decoding, an intraframe is first subjected to intra-frame decoding, and then following interframes are decoded in order. An interframe is decoded by decoding a difference frame first and then adding the decoded difference frame to the preceding frame.

In actual inter-frame compression encoding, a frame is divided into several blocks, and intra-frame encoding or inter-frame encoding is chosen block by block. A block subjected to intra-frame encoding is called an intrablock, and a block subjected to inter-frame encoding is called an interblock. An intraframe is a frame consisting only of intrablocks, and an interframe is a frame including an interblock.

Encoding an interblock not only simply determines a difference between blocks, but also employs a motion vector. This allows to determine a difference between a block to be encoded and a block with which the block to be encoded is most highly correlated, and thereby improves compression ratio.

An intraframe can be decoded immediately. An interframe includes an interblock, so it can be decoded only if it is added with a block in the already-decoded preceding frame. An interframe cannot be decoded until the preceding frame is decoded. That is, an interframe cannot be decoded until preceding frames have been decoded in order from the nearest preceding intraframe. This is a problem common to inter-frame compression techniques that exploit the temporal redundancy. As a result, an image recorded by a DVD recorder cannot be started from an arbitrary point in its random-access playback, and a playback starting point is limited to where an intraframe was inserted. This problem can seemingly be avoided by frequently inserting intraframes. However, since the compression ratio of an intraframe is low, insertion of many intraframes would significantly make the compression ratio of a moving image worse.

One example of the inconvenience caused by the fact that an inter-frame compressed moving image cannot be started to decode with an interframe is participation in a multipoint videoconference. There are two methods to implement a multipoint videoconference. One method is that moving images shot by each terminal are gathered to a multipoint conference apparatus called an MCU, and that the MCU combines all the moving images and then sends them back to each terminal. The other method is that a terminal on the transmitting side makes a multi-address transmission of a moving image shot by the terminal to all terminals, and that a terminal on the receiving side combines transmitted moving images. In either method, if an inter-frame compression technique is used for moving image compression, a terminal that newly participates during a conference cannot start to decode with an interframe, and therefore the terminal starts to play after the next intraframe arrives. As a result, a condition occurs in which no image is displayed for some time despite the participation in the conference.

Another example of the inconvenience caused by the fact that an inter-frame compressed moving image cannot be started to decode with an interframe is the start of play or channel switching in a digital moving image broadcasting service. Terrestrial digital broadcasting, mobile broadcasting using a satellite, and the like have been started as broadcasting services. A decoder used in a digital television or other terminals, when broadcasting reception is started or when a channel is switched, starts to play the receiving channel after a next intraframe arrives.

Japanese Patent Laid-Open Publication No. Heisei 7-298231 discloses a technique for decoding and displaying an image immediately after participation of a new terminal in a multipoint videoconference. According to Japanese Patent Laid-Open Application No. Heisei 7-298231, a participant terminal notifies, of its participation, an MCU in a first method of implementing a videoconference, or all terminals which have already participated in a conference in a second method of implementing a videoconference. In response to the notification, the MCU or all the terminals participating in the conference subject moving images shot by the terminals to intra-frame encoding and send intraframes for a certain period of time. This allows the new participant terminal to immediately decode and display frames.

DISCLOSURE OF THE INVENTION

Problems to be Solved by the Invention

However, in Japanese Patent Laid-Open Application No. Heisei 7-298231, network bandwidth is consumed for the certain period of time after the notification of conference participation, since intraframes continue to be sent for the time period. Terminals on the other end are required to dynamically change their encoding mode, so there remains a problem that the methods can only be applied to systems doing realtime encoding.

In techniques for decoding and displaying a moving image at the start of play or channel switching in a digital moving image broadcasting service, a playback of the receiving channel is started after a next intraframe arrives. Consequently, there occurs a problem that no image is displayed on a screen for a while.

The invention, made in view of the above problem in conventional decoding of an inter-frame compressed moving image, provides a moving image receiving apparatus that can decode an inter-frame compressed moving image from an arbitrary frame and makes screen display without delay when participating at a certain point in a videoconference and when starting to play or switching channels in a digital moving image broadcasting service.

Means for Solving the Problems

A moving image receiving apparatus of the invention comprises: a moving image data receiver for receiving moving image data comprising a plurality of intraframes and interframes; a media buffer for accumulating moving image data received by the moving image data receiver; an intra-map storage for storing an intra-map indicating a location of an intrablock included in each interframe of the moving image data; a pseudo intraframe generator that, based on an intra-map stored in the intra-map storage, extracts an image of an intrablock included in an interframe in order from a latest interframe accumulated in the media buffer, combines images of intrablocks extracted from a plurality of interframes, and thereby generates a pseudo intraframe; and a decoder that starts to decode moving image data received by the moving image data receiver, using a pseudo intraframe generated by the pseudo intraframe generator.

By extracting intrablocks included in interframes and by combining the intrablocks to generate a pseudo intraframe as above, decoding can be started by using a pseudo intraframe after an instruction to decode a moving image is given, without waiting for the next intraframe to be received.

In the above-described moving image receiving apparatus, when intrablocks applicable as blocks comprising a pseudo intraframe have been extracted from a plurality of interframes, the pseudo intraframe generator may use an image of an intrablock extracted from a later interframe.

Using an intrablock extracted from a later interframe as above allows to generate a pseudo intraframe which is close to an image of a frame currently being received.

The above-described moving image receiving apparatus may have: an intra-map generator for generating, from moving image data received by the moving image data receiver, an intra-map of the moving image data, where an intra-map generated by the intra-map generator may be stored in the intra-map storage.

Generating an intra-map as above allows a pseudo intraframe to be generated without receiving intra-map data. In addition, by storing the generated intra-map in the intra-map storage, there is no need to perform a process of generating an intra-map after an instruction to decode a moving image is given, and the decoding process can be started quickly.

The above-described moving image receiving apparatus may have: a motion vector map storage for storing a motion vector map indicating a block-by-block inter-frame motion vector of the moving image data, where the pseudo intraframe generator may move images of intrablocks extracted from a plurality of interframes to locations determined based on a motion vector map, may combine the images, and may thereby generate a pseudo intraframe.

Using a motion vector map as above allows an appropriate pseudo intraframe to be generated even when a moving image has a large motion.

The above-described moving image receiving apparatus may have: a motion vector map generator for generating, from moving image data received by the moving image data receiver, a motion vector map of the moving image data, where a motion vector map generated by the motion vector map generator may be stored in the motion vector map storage.

Generating a motion vector map as above allows a pseudo intraframe to be generated without receiving motion vector map data. In addition, by storing the generated motion vector map in the motion vector map storage, there is no need to perform a process of generating a motion vector map after an instruction to decode a moving image is given, and the decoding process can be started quickly.

A moving image receiving apparatus of another aspect of the invention comprises: a moving image data receiver for receiving moving image data comprising a plurality of intraframes and interframes; a media buffer for accumulating moving image data received by the moving image data receiver; a motion vector map storage for storing a motion vector map indicating a block-by-block inter-frame motion vector of the moving image data; a pseudo intraframe generator that, based on a motion vector map stored in the motion vector map storage and going back from a latest interframe, identifies an intrablock in an intraframe corresponding to each block comprising the latest interframe, and generates a pseudo intraframe using an image of the identified intrablock; and a decoder that starts to decode moving image data received by the moving image data receiver, using a pseudo intraframe generated by the pseudo intraframe generator.

As above, by going back from a latest interframe to an intraframe based on a motion vector map, a pseudo intraframe can be generated based on an image of each block of the intraframe. Decoding can thus be started by using a pseudo intraframe after an instruction to decode a moving image is given, without waiting for the next intraframe to be received.

The above-described moving image receiving apparatus may have: a motion vector map generator for generating, from moving image data received by the moving image data receiver, a motion vector map of the moving image data, where a motion vector map generated by the motion vector map generator may be stored in the motion vector map storage.

Generating a motion vector map as above allows a pseudo intraframe to be generated without receiving motion vector map data. In addition, by storing the generated motion vector map in the motion vector map storage, there is no need to perform a process of generating a motion vector map after an instruction to decode a moving image is given, and the decoding process can be started quickly.

A moving image playback apparatus of the invention comprises: a moving image data player for playing moving image data comprising a plurality of intraframes and interframes; an intra-map generator for generating, based on a moving image being played by the moving image data player, an intra-map indicating a location of each intrablock in an interframe included in the moving image; and a moving image data transmitter for transmitting, with the moving image data, an intra-map generated by the intra-map generator.

By generating an intra-map during playback of a moving image and by transmitting the intra-map when the moving image data is transmitted as above, an apparatus that received the moving image can start to decode the moving image based on the intra-map at an arbitrary timing without waiting for an intraframe.

The above-described moving image playback apparatus may have: a motion vector map generator for generating, based on a moving image being played by the moving image data player, a motion vector map indicating a block-by-block inter-frame motion vector of the moving image.

By generating a motion vector map during playback of a moving image and by transmitting the motion vector map with an intra-map when the moving image data is transmitted as above, an apparatus that received the moving image can start to decode the moving image at an arbitrary timing without waiting for an intraframe.

The invention allows decoding to be started using a pseudo intraframe after an instruction to decode a moving image is given, without waiting for the next intraframe to be received. The invention has a great advantage of making screen display without delay at the time of participation at a certain point in a videoconference and of the start of play or channel switching in a digital moving image broadcasting service.

There are other aspects of the invention as described below. This disclosure of the invention therefore intends to provide part of the invention and does not intend to limit the scope of the invention described and claimed herein.

BEST MODE OF EMBODYING THE INVENTION

The following is a detailed description of the invention. It will be understood that the embodiments described below are only examples of the invention, and the invention can be varied in various aspects. Therefore, the specific configurations and functions disclosed below do not limit the claims.

First Embodiment

Figure 1:
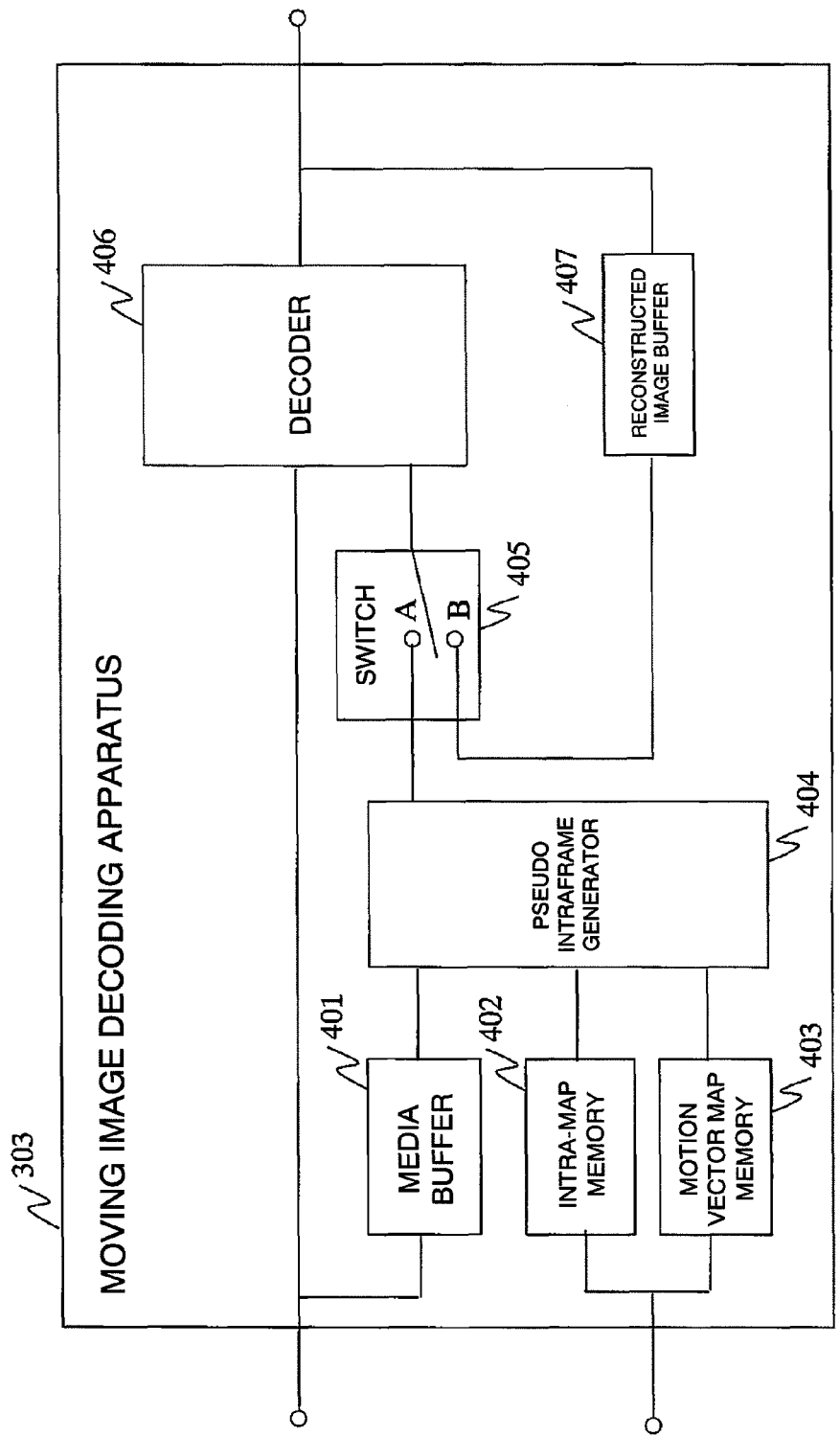
FIG. 1 is a block diagram showing a configuration of a moving image decoding apparatus of a first embodiment.

FIG. 1 shows a configuration of a moving picture decoding apparatus of a moving picture receiving apparatus of a first embodiment. Before a description of the configuration for decoding a moving image is given with reference to FIG. 1, a moving image transmitting and receiving system to which the moving image receiving apparatus of the first embodiment is applied will be described.

Figure 2:
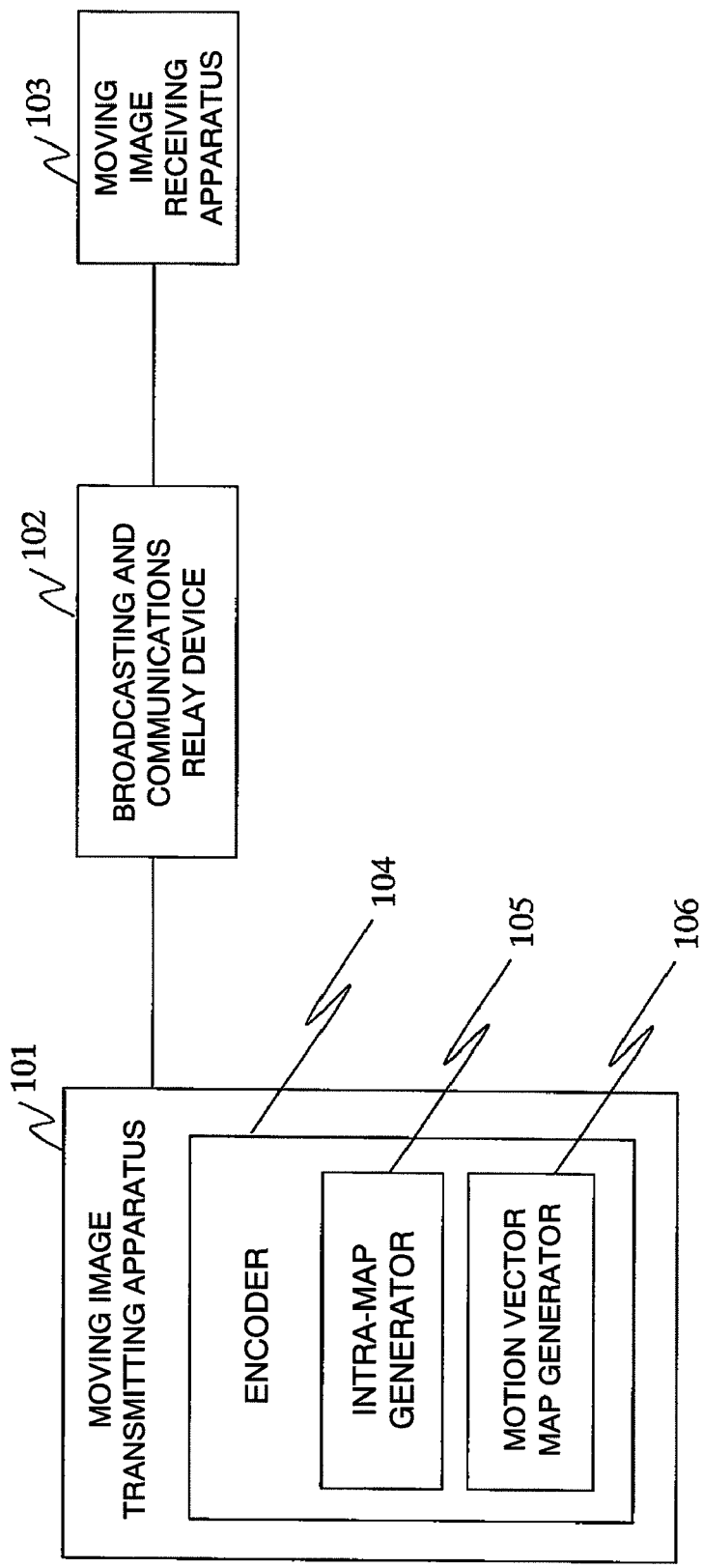
FIG. 2 is a block diagram showing a configuration of a moving image transmitting and receiving system related to the moving image decoding apparatus of the first embodiment.

FIG. 2 shows a configuration of the moving image transmitting and receiving system to which the moving image receiving apparatus of the first embodiment is applied. The moving image transmitting and receiving system comprises: a moving image transmitting apparatus 101 for transmitting an inter-frame compressed moving image; a broadcasting and communications relay device 102 that is a data transmission medium; and the moving image receiving apparatus 103 that receives a transmitted inter-frame compressed moving image, decodes it, and then displays it on an output device such as a display. The moving image decoding apparatus of the embodiment is set up in the moving image receiving apparatus 103.

The moving image transmitting apparatus 101 has an encoder 104 that compresses a moving image between frames, and can transmit a generated inter-frame compressed moving image by means of a not shown sending unit. The moving image transmitting apparatus 101 corresponds, for example, to a moving image broadcasting server for doing digital broadcasting in a broadcasting station, or to an MCU in a videoconference system.

The broadcasting and communications relay device 102 includes all media that transmits data transmitted from the moving image transmitting apparatus 101 to the moving image receiving apparatus 103. In broadcasting, a broadcasting satellite, transmitting and receiving antennas, and the like are part of the broadcasting and communications relay device 102; and in communications, an optical fiber, a router, and the like are part of the broadcasting and communications relay device 102. The broadcasting and communications relay device 102 transmits data transmitted from the moving image transmitting apparatus 101 to the moving image receiving apparatus 103 on, but not limited to, broadcasting or communications.

The moving image receiving apparatus 103 has the moving image decoding apparatus (see FIG. 1), which is the first embodiment of the invention, quickly decodes and displays a received inter-frame compressed moving image. The moving image receiving apparatus 103 corresponds, for example, to a digital television, or to a videoconference terminal.

The encoder 104 of the moving image transmitting apparatus 101 will be described next. The encoder 104 comprises an intra-map generator 105 and a motion vector map generator 106, and frame by frame generates an intra-map and a motion vector map when encoding each frame of a moving image. An intra-map is a map that indicates a location of an intra-encoded block included in a frame. A motion vector map is a map that indicates a relation between a location and motion vector of an inter-encoded block included in a frame.

Figure 3A:
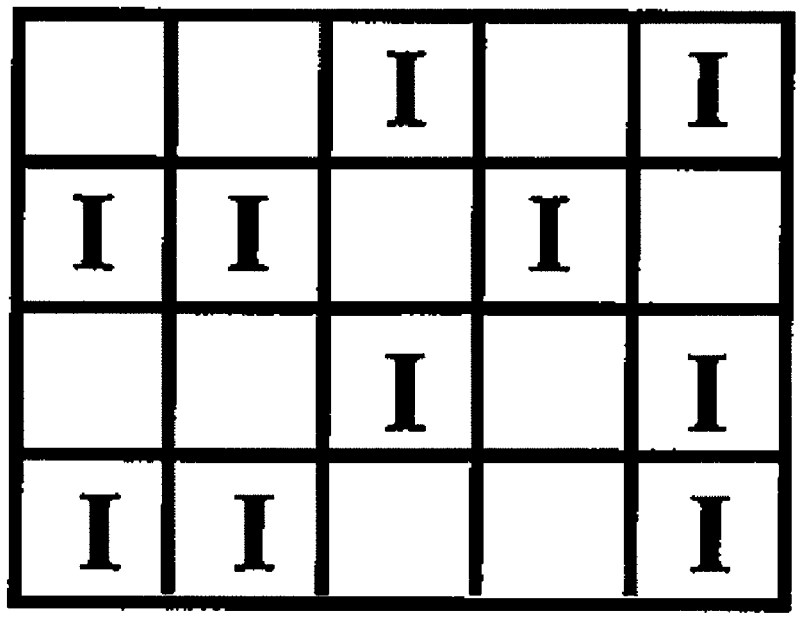
FIG. 3A shows an example of an intra-map.

FIG. 3A shows an example of an intra-map. The outline box indicates one frame, and small rectangles spread all over the frame indicate blocks comprising the frame. In FIG. 3A, an intrablock is denoted by "I." An intrablock's location in the frame can be known from an intra-map.

Figure 3B:
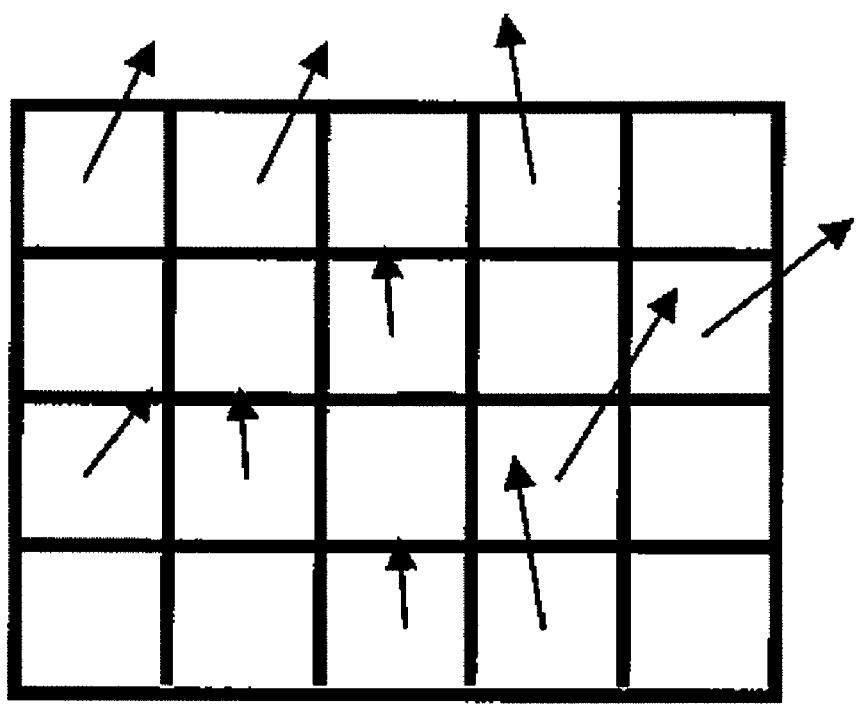
FIG. 3B shows an example of a motion vector map.

FIG. 3B shows an example of a motion vector map. The outline box indicates one frame, and small rectangles spread all over the frame indicate blocks comprising the frame. In FIG. 3B, a motion vector is shown in the center of each interblock. An interblock's location in the frame and a motion vector of the block can be known from an intra-map and a motion vector map.

The intra-map shown in FIG. 3A and the motion vector map shown in FIG. 3B are one example. As long as required information is provided which is a location of an intrablock and a location and motion vector of an interblock, the map format such as the arrangement and bitstream is not bound by the forms shown in FIGS. 3A and 3B. While in the embodiment the encoder 104 comprises the intra-map generator 105 and the motion vector map generator 106, it may be one that has only one of the intra-map generator 105 and the motion vector map generator 106.

When the moving image transmitting apparatus 101 transmits an inter-frame compressed moving image and if the intra-map generator 105 of the encoder 104 generates an intra-map, the moving image transmitting apparatus 101 transmits the intra-map with the image. When the moving image transmitting apparatus 101 transmits an inter-frame compressed moving image and if the motion vector map generator 106 of the encoder 104 generates a motion vector map, the moving image transmitting apparatus 101 transmits the motion vector map with the image. As a result, the moving image receiving apparatus 103 receives an intra-map and a motion vector map in synchronization with an inter-frame compressed moving image. Using an intra-map and a motion vector map, the moving image receiving apparatus 103 can immediately start to decode with an interframe.

Figure 4:
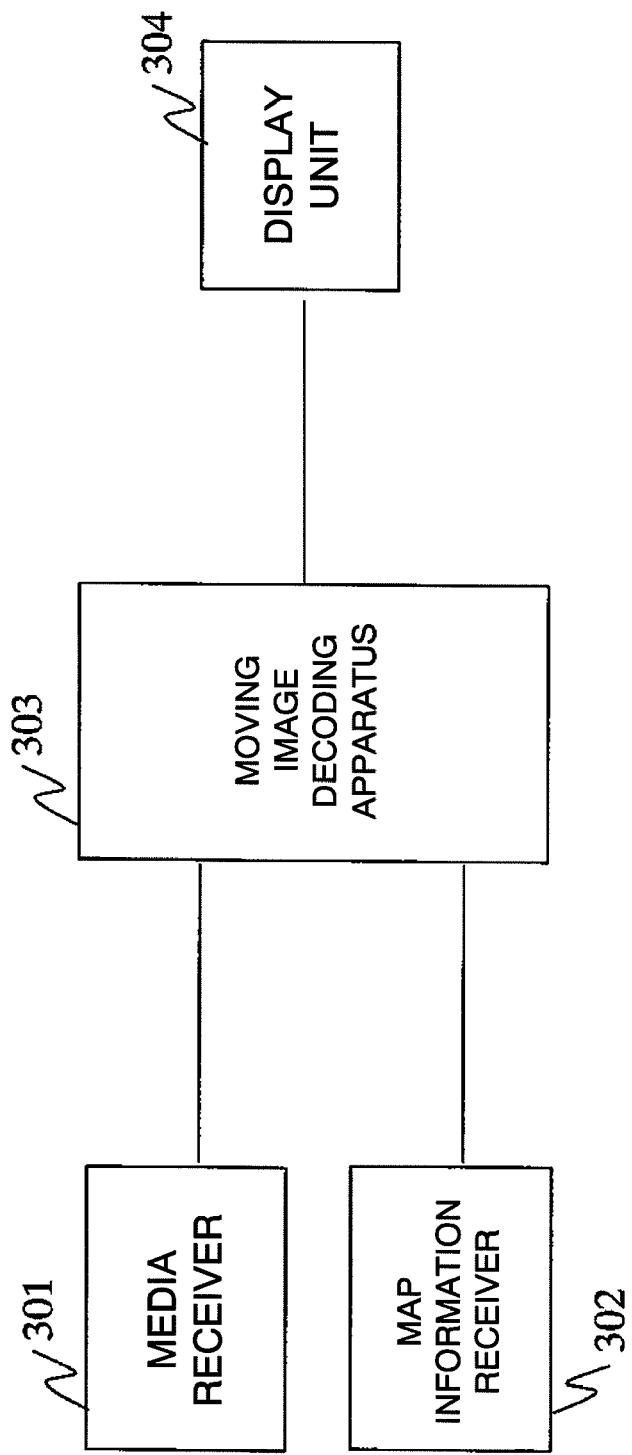
FIG. 4 is a block diagram showing an internal configuration of the moving image receiving apparatus of the moving image transmitting and receiving system of the first embodiment.

FIG. 4 shows a configuration of the moving image receiving apparatus 103. The moving image receiving apparatus 103 comprises: a media receiver 301 for receiving an inter-frame compressed moving image; a map information receiver 302 for receiving an intra-map and a motion vector map; a moving image decoding apparatus 303 for decoding an inter-frame compressed moving image received by the media receiver 301 immediately from an arbitrary frame, using an intra-map and motion vector map received by the map information receiver 302; and a display unit 304 for externally outputting an uncompressed moving image decoded by the moving image decoding apparatus 303.

The media receiver 301 extracts only inter-frame compressed moving images from transmitted data. The media receiver 301 corresponds to the function of a receiver or tuner in digital broadcasting, and to a socket interface or packet reconstruction function in communications. The media receiver 301 receives one or a plurality of streams at the same time, and transmits them to the moving image decoding apparatus 303. The map information receiver 302 extracts an intra-map and a motion vector map from transmitted data, and transmits the extracted maps to the moving image decoding apparatus 303.

The display unit 304 displays an uncompressed image decoded by the moving image decoding apparatus 303. The display unit 304 corresponds, for example, to a display. With the above configuration, the moving image receiving apparatus 103 can start to decode a received inter-frame compressed moving image immediately with an interframe or other arbitrary frame.

FIG. 1 shows a configuration of the moving image decoding apparatus 303 of the first embodiment. The moving image decoding apparatus 303 has: a media buffer 401 for accumulating a plurality of the latest frames of inter-frame compressed moving images from inter-frame compressed moving images extracted by the media receiver 301; and an intra-map memory 402 and a motion vector map memory 403 for storing a plurality of the latest frames of intra-maps and motion vector maps, respectively, extracted by the map information receiver 302.

The moving image decoding apparatus 303 has: a pseudo intraframe generator 404 for generating a pseudo intraframe from inter-frame compressed moving images accumulated in the media buffer 401; a decoder 406 for decoding an inter-frame compressed image; a reconstructed image buffer 407 for storing a reconstructed image outputted by the decoder 406, in order to decode the next inter-frame compressed image; and a switch 405 for switching an input for the decoder 406.

A pseudo intraframe generated by the pseudo intraframe generator 404 is an image for decoding a latest inter-frame compressed image inputted to the moving image decoding apparatus 303. A pseudo intraframe corresponds to an image decoded from an inter-frame compressed image which is one frame before the latest inter-frame compressed image. Based on intra-maps and motion vector maps stored in the intra-map memory 402 and motion vector map memory 403, the pseudo intraframe generator 404 generates a pseudo intraframe from inter-frame compressed moving images.

The media buffer 401, the intra-map memory 402, and the motion vector map memory 403 store each data frame by frame, and can retrieve data frame by frame. The reconstructed image buffer 407 holds one frame of uncompressed reconstructed image. Reconstructed image data in the reconstructed image buffer 407 is overwritten when new data is inputted thereto.

The decoder 406 is a common decoder that decodes an inter-frame compressed moving image, starting with an intraframe. An inter-frame compressed image and an image to be used for decoding the inter-frame compressed image are inputted to the decoder 406.

When either an intra-map or a motion vector map is not transmitted from the moving picture transmitting apparatus 101, nothing is accumulated in the memory corresponding to the not transmitted map. In this case, the moving image decoding apparatus 303 is not required to be equipped with both the intra-map memory 402 and the motion vector map memory 403, but is only required to have the memory corresponding to data to be transmitted. In the following description of the embodiment, both an intra-map and a motion vector map are transmitted and the moving image decoding apparatus 303 has both the intra-map memory 402 and the motion vector map memory 403, unless otherwise noted.

Figure 5:
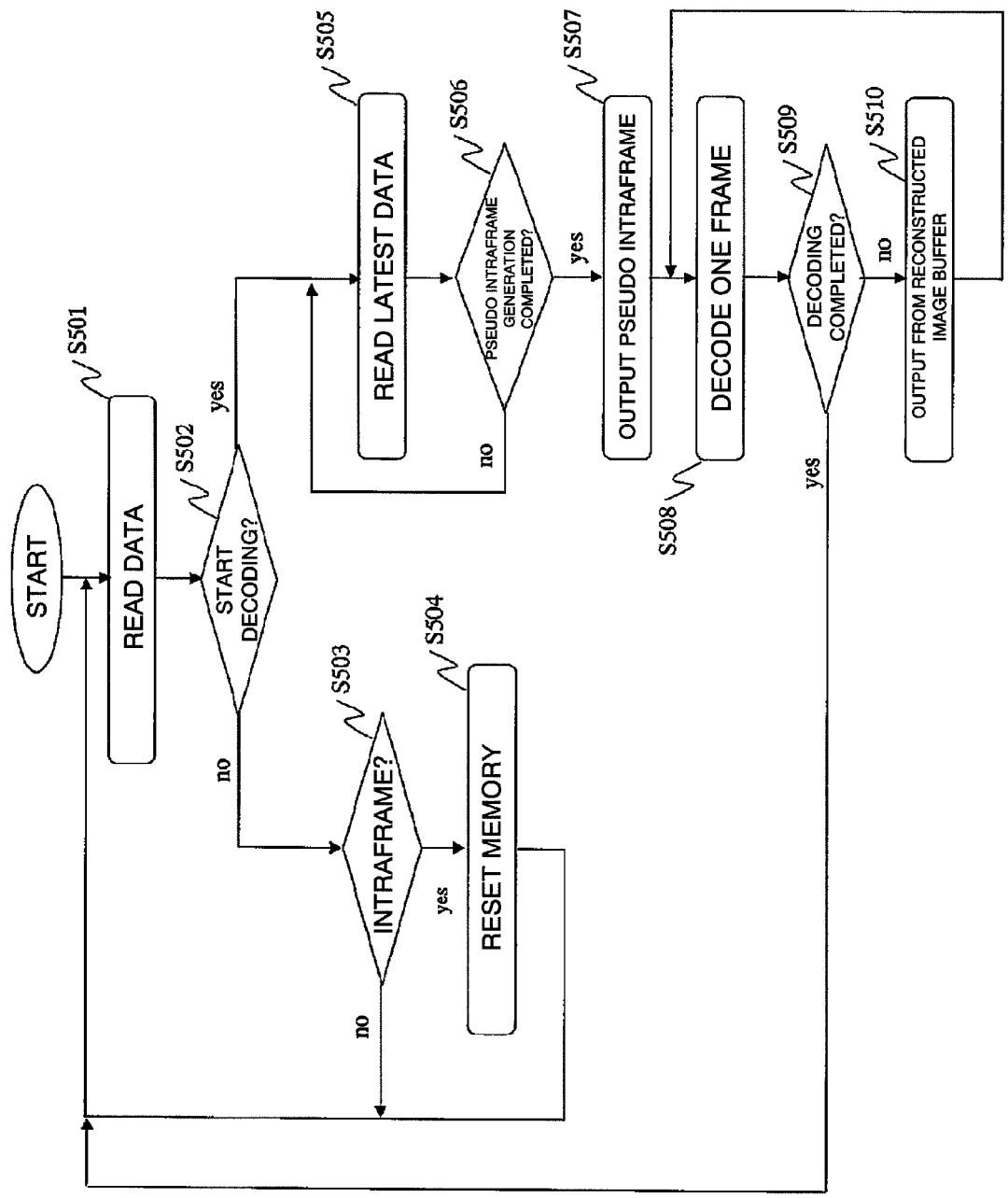
FIG. 5 is a flowchart showing an operation flow of the moving image decoding apparatus of the first embodiment.

FIG. 5 shows an internal operation of the moving image decoding apparatus 303. First, the moving image decoding apparatus 303 reads media data received by the media receiver 301, and stores it in the media buffer 401; and at the same time reads an intra-map and a motion vector map received by the map information receiver 302, and stores them in the intra-map memory 402 and the motion vector map memory 403, respectively (S501).

In this state, the moving image decoding apparatus 303 judges whether a decoding start instruction has been inputted or not (S502). If a decoding start instruction has not been inputted (NO at S502), the moving image decoding apparatus 303 judges whether the frame read into the media buffer 401 is an intraframe or not (S503). If the read frame is an intraframe (YES at S503), the moving image decoding apparatus 303 sends a reset notification to the media buffer 401, the intra-map memory 402, and the motion vector map memory 403, and deletes all data stored in each memory (S504). The moving image decoding apparatus 303 then reads data again (S501). If the read frame is not an intraframe (NO at S503), the moving image decoding apparatus 303 does not delete data stored in the memories, but reads data again (S501).

An operation will be described next for a case in which a decoding start instruction is inputted during the reading of data (S501) (YES at S502). If a decoding start has been inputted, the pseudo intraframe generator 404 of the moving image decoding apparatus 303 reads each of inter-frame compressed image data, intra-map data, and motion vector map data that are related to the most recently inputted frame, from the media buffer 401, the intra-map memory 402, and the motion vector map memory 403 (S505).

Using each of the read inter-frame compressed image data, intra-map data, and motion vector map data, the pseudo intraframe generator 404 generates a pseudo intraframe. The moving image decoding apparatus 303 judges whether the pseudo intraframe generator 404 has completed the generation of a pseudo intraframe or not (S506). If the generation of a pseudo intraframe has not been completed (NO at S506), data related to the next most recently inputted frame is read from the media buffer 401, the intra-map memory 402, and the motion vector map memory 403 (S505), and a pseudo intraframe is generated by using the data. That is, the moving image decoding apparatus 303 reads data in order from the latest to generate a pseudo intraframe until it completes to generate a pseudo intraframe.

If the pseudo intraframe generator 404 has completed the generation of a pseudo intraframe, the moving image decoding apparatus 303 connects the switch 405 to an output of the pseudo intraframe generator 404 (contact A, see FIG. 1) (S507). Consequently, the pseudo intraframe generated by the pseudo intraframe generator 404 is inputted to the decoder 406.

Using the inputted pseudo intraframe, the decoder 406 of the moving image decoding apparatus 303 decodes a latest inter-frame compressed image inputted from the receiver 301, and outputs the decoded reconstructed image to the outside of the moving image decoding apparatus 303 and to the reconstructed image buffer 407 (S508).

The moving image decoding apparatus 303 judges whether decoding has completed or not (S509). If decoding has completed (YES at S509), the decoder 406 completes the operation and goes on to the data reading step (S501). The moving image decoding apparatus 303 turns the switch 405 to the disconnected state.

If decoding has not completed (NO at S509), the switch 405 is connected to an output of the reconstructed image buffer 407 (contact B, see FIG. 1). Consequently, a reconstructed image held in the reconstructed image buffer 407 is outputted to the decoder 406 (S510), and decoding is continued (S508).

As above, the moving image decoding apparatus 303 can decode an inter-frame compressed moving image immediately from a latest received frame regardless of whether it is an intraframe or an interframe.

Now, the operation of pseudo intraframe generation in the pseudo intraframe generator 404 (S506) will be described in more detail. As already described by the flowchart of FIG. 5, an inter-frame compressed image, an intra-map, and a motion vector map that are related to a latest frame are inputted to the pseudo intraframe generator 404, which using them generates a pseudo intraframe. If the generation of a pseudo intraframe has not been completed, the pseudo intraframe generator 404 repeatedly input an inter-frame compressed image, an intra-map, and a motion vector map that are related to a frame one frame temporally before the inputted frame, and generates a pseudo intraframe. It is considered that there are a plurality of pseudo intraframe generation methods in the pseudo intraframe generator 404, the methods using intra-maps and motion vector maps. From among the plurality of pseudo intraframe generation methods, descriptions will be made here of: (i) an example in which only intra-maps are used (see FIG. 6); (ii) an example in which intra-maps and motion vector maps are used (see FIG. 7); and (iii) an example in which only motion vector maps are used (see FIG. 10).

Figure 6:
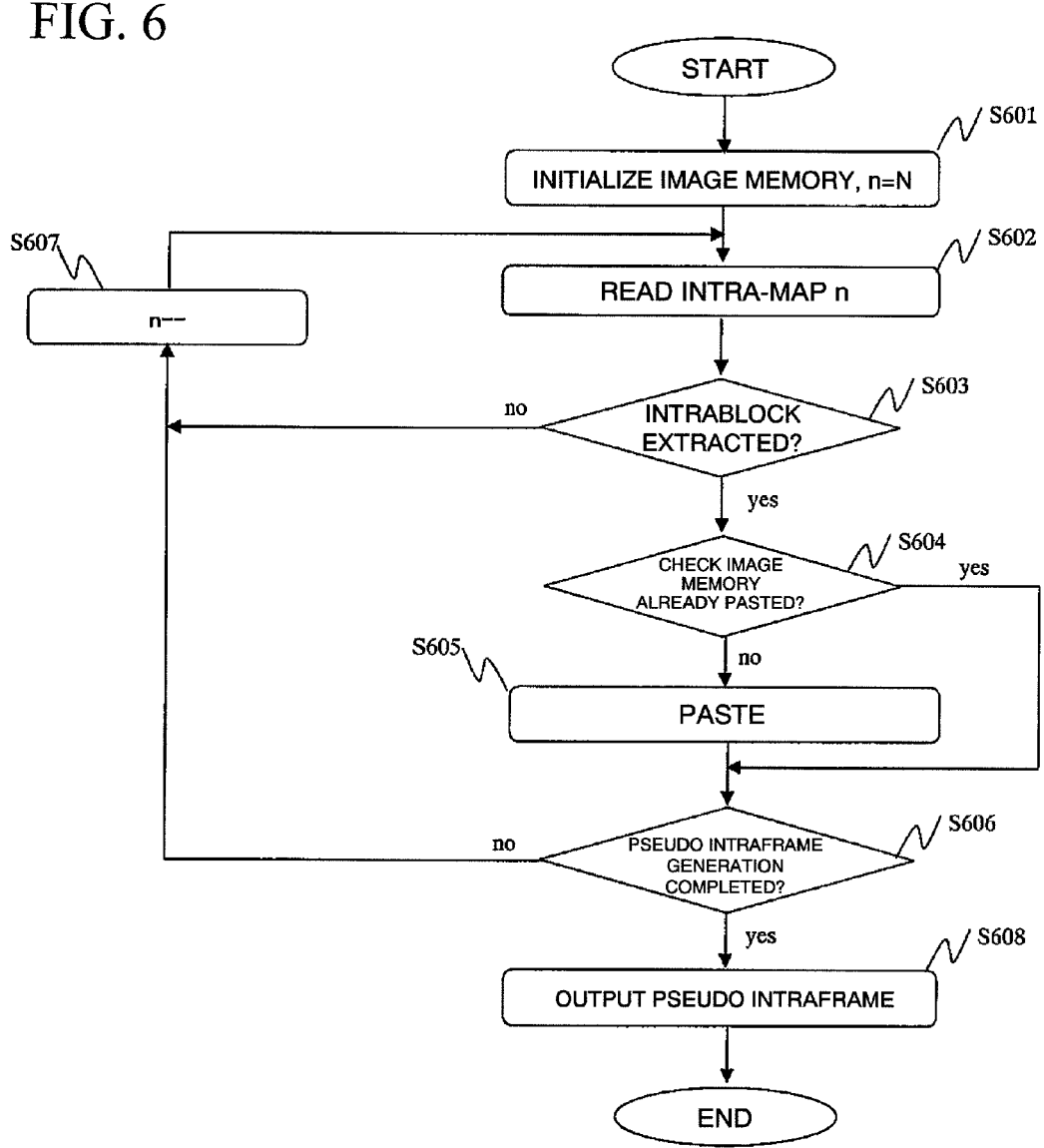
FIG. 6 is a flowchart showing an example of a pseudo intraframe generation method in a pseudo intraframe generator of the first embodiment, the method using only intra-maps.

FIG. 6 shows an example of a pseudo intraframe generation method in the pseudo intraframe generator 404, the method using only intra-maps. For convenience of description, inter-frame compressed moving images and intra-maps that are accumulated in the media buffer 401 and the intra-map memory 402 are numbered. Let Frame 0 be an intraframe, and let Intra-map 0 be an intra-map related to Frame 0; let Frame n (n is a natural number) be a following frame, and let Intra-map n (n is a natural number) be an intra-map related to Frame n; and let Frame N and Intra-map N be a latest accumulated frame and intra-map, respectively. The pseudo intraframe generator 404 has an image memory for generating a pseudo intraframe.

The pseudo intraframe generator 404 initializes the image memory, and resets the data number n to N (S601). The pseudo intraframe generator 404 reads Intra-map n from the intra-map memory 402 (S602), and extracts from Frame n intrablocks included in Frame n, based on Intra-map n (S603). If there is no intrablock in Frame n at all, the pseudo intraframe generator 404 decrements n in order to move the process to the next frame (S607), reads an intra-map of the next frame, and repeats the same process (S602).

If an intrablock has been extracted from Interframe n (YES at S603), the pseudo intraframe generator 404 pastes into the image memory the intrablock extracted from Frame n. The pseudo intraframe generator 404 judges whether an intrablock has already been pasted into the location where the extracted intrablock is to be pasted or not (S604). If an intrablock has not yet been pasted into the paste location (NO at S604), the pseudo intraframe generator 404 pastes the extracted intrablock. If an intrablock has already been pasted (YES at S604), the pseudo intraframe generator 404 does not paste the intrablock. The pseudo intraframe generator 404 performs the above operation (S604 and S605) on intrablocks extracted from one frame.

The pseudo intraframe generator 404 checks the image memory and judges whether the generation of a pseudo intraframe has been completed or not, that is, whether all blocks have been pasted or not (S606). If the generation of a pseudo intraframe has not been completed (NO at S606), the pseudo intraframe generator 404 decrements n in order to perform the process on data related to the next frame (S607), reads an intra-map of the next frame, and repeats the same process (S602). If the generation of a pseudo intraframe has been completed (YES at S606), the pseudo intraframe generator 404 outputs the pseudo intraframe held in the image memory to the outside of the pseudo intraframe generator 404.

The above is the operation of the pseudo intraframe generation method in the pseudo intraframe generator 404, the method using only intra-maps. A pseudo intraframe is generated by pasting together intrablocks included in a plurality of inter-frame compressed moving images accumulated in the media buffer 401. A pseudo intraframe that is close to the actual image can be generated by using with priority intrablocks included in temporally new inter-frame compressed moving images.

Figure 7:
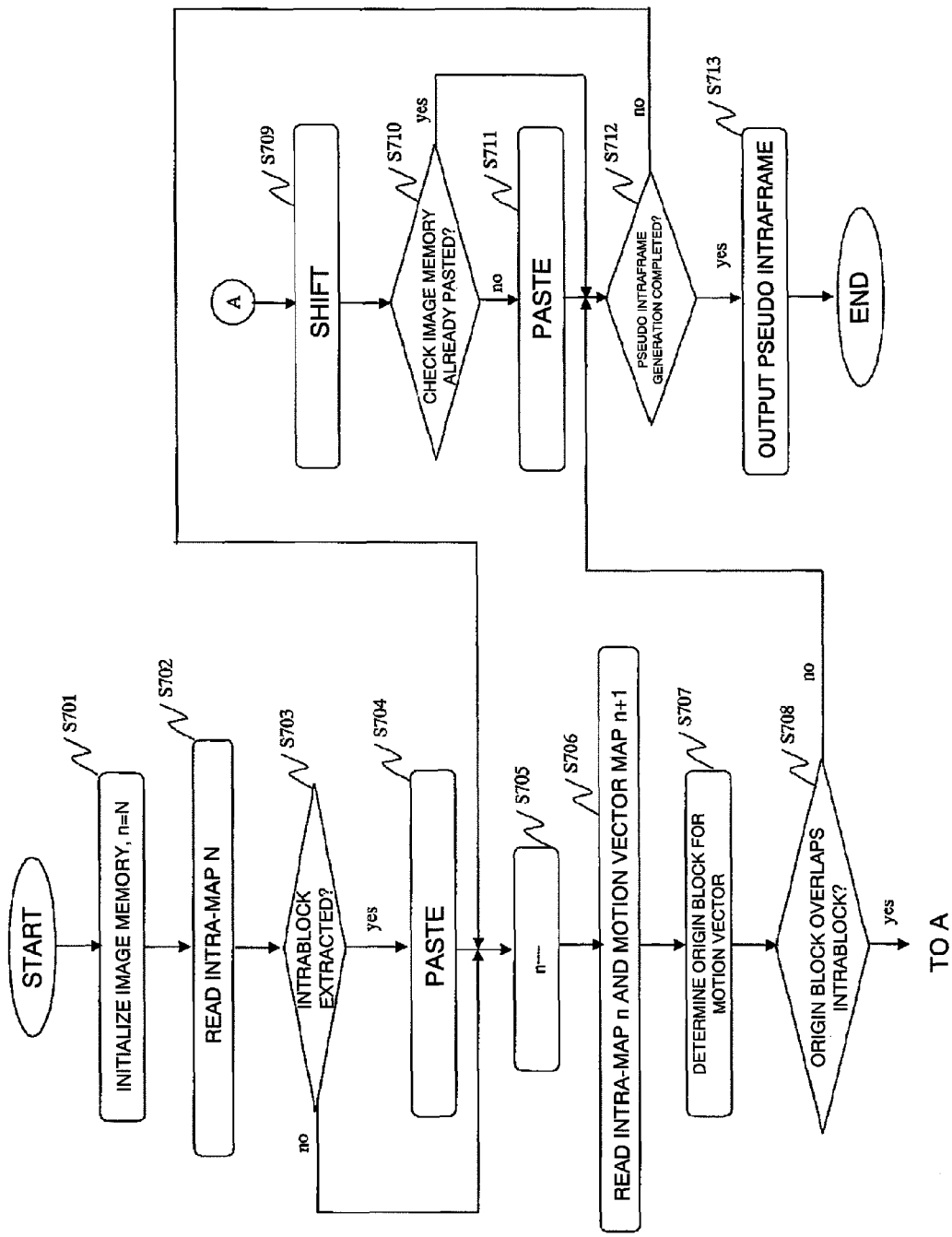
FIG. 7 is a flowchart showing an example of a pseudo intraframe generation method in the pseudo intraframe generator of the first embodiment, the method using intra-maps and motion vector maps.

FIG. 7 shows an operation of a pseudo intraframe generation method in the pseudo intraframe generator 404, the method using intra-maps and motion vector maps. For convenience of description, inter-frame compressed moving images, intra-maps, and motion vector maps that are accumulated in the media buffer 401, the intra-map memory 402, and the motion vector map memory 403 are numbered. The numbering is the same as in the case of the description of FIG. 6.

The pseudo intraframe generator 404 initializes the image memory, as well as resets the data number n to N (S701). The pseudo intraframe generator 404 reads Intra-map N from the intra-map memory 402 (S702), and extracts from Frame N intrablocks included in Frame N, based on Intra-map N. If there are any intrablocks in the frame (YES at S703), the pseudo intraframe generator 404 pastes into the image memory the intrablocks extracted from Frame N (S704), and decrements n in order to move the process to the next frame (S705). If there is no intrablock in Frame N at all (NO at S703), the pseudo intraframe generator 404 does not perform the intrablock paste step, and decrements n in order to move the process to the next frame (S705).

The pseudo intraframe generator 404 reads Intra-map n and Motion vector map n+1 from the intra-map memory 402 and the motion vector map memory 403, respectively. Based on Motion vector map n+1, the pseudo intraframe generator 404 determines in Frame n an origin block of a motion vector for every interblock of Frame n+1. An origin block is a block located in a position with which the interblock is most highly correlated in a search area in Frame n.

Figure 8:
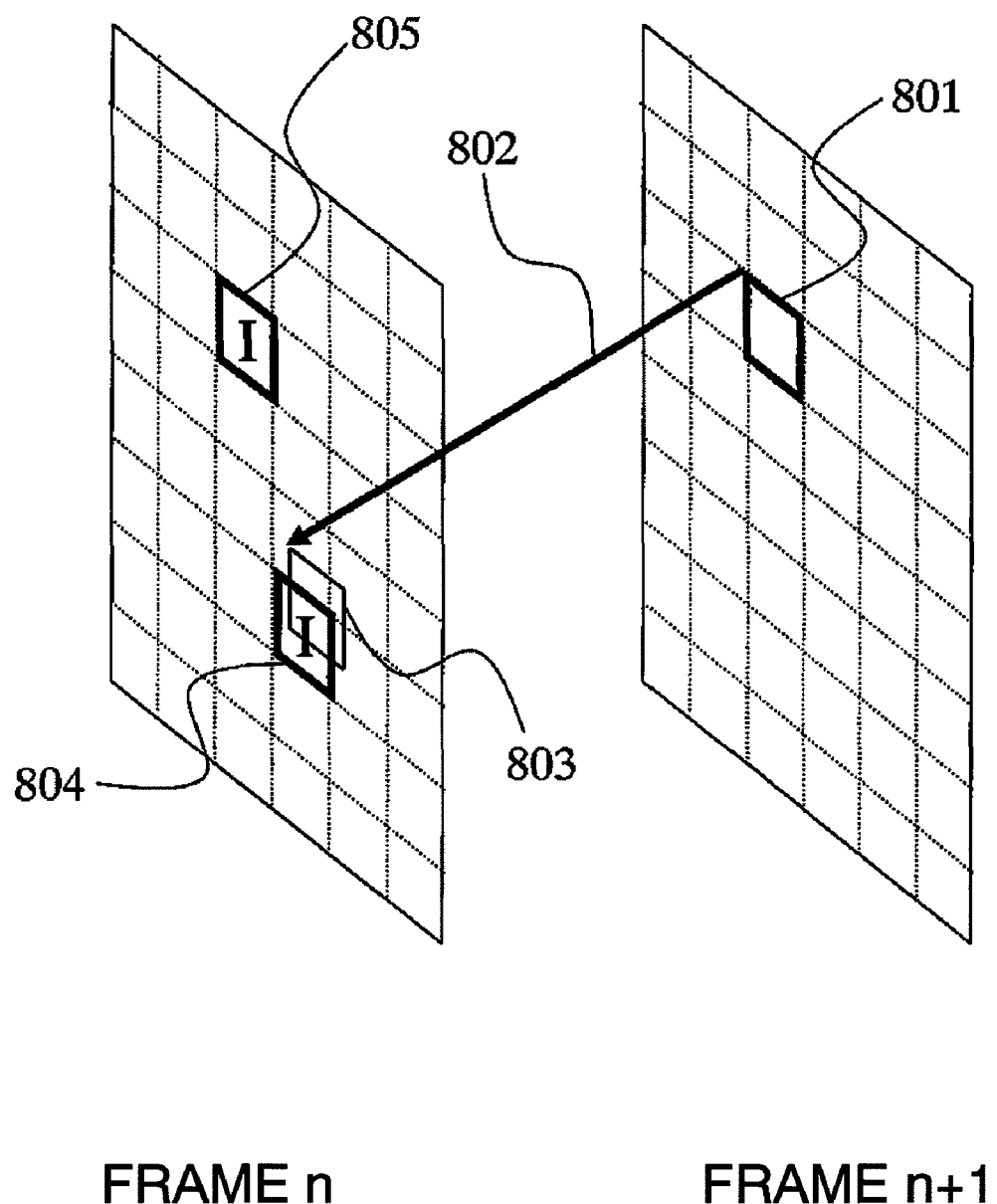
FIG. 8 illustrates the pseudo intraframe generation method in the pseudo intraframe generator of the first embodiment, the method using intra-maps and motion vector maps.

FIG. 8 shows relations among an interblock, a motion vector, an origin block, an intrablock overlapping the origin block, and a shifted intrablock. FIG. 8 shows Frame n and Frame n+1. Frame n+1 is a frame that is temporally newer than Frame n, that is, Frame n+1 is a frame following Frame n. Let an interblock 801 be one interblock in Frame n+1, and let a motion vector 802 be a motion vector of the interblock 801.

A block corresponding to the interblock 801 is determined in Frame n from the location of the interblock 801 in Frame n+1 and the motion vector 802. The block corresponding to the interblock in Frame n+1 is called an origin block 803. The origin block is a block in Frame n indicating an image with which the image of the interblock 801 is most highly correlated. The motion vector of the interblock 801 shows that an image block in the location of the origin block moved to the location of the interblock 801 over a time from Frame n to Frame n+1.

In this example, the origin block 803 overlaps four blocks in Frame n. Since Intra-map n shows locations of intrablocks included in Frame n, an intrablock 804 that overlaps the origin block can be identified. In the example, three blocks other than the intrablock 804 are not intrablocks. If an origin block overlaps a plurality of intrablocks, one having the largest overlapping area, for example, may be chosen.

Returning to FIG. 7, the description of the operation of pseudo intraframe generation will be continued. The pseudo intraframe generator 404 judges whether in Frame n there is an intrablock overlapping an origin block or not (S708). Intra-map n is used for judging whether an origin block overlaps an intrablock or not. If an origin block overlaps an intrablock (YES at S708), the pseudo intraframe generator 404 shifts the overlapping intrablock in Frame n to the same location as the interblock of Frame n+1 (S709).

As shown in FIG. 8, the intrablock 804 shifted in Frame n to the location of the interblock 801 is a shifted intrablock 805. The shifted intrablock 805 does not affect a block that is in the same location in Frame n.

Returning to FIG. 7, the pseudo intraframe generator 404 judges whether an image has been pasted into the image memory at a shifted location or not (S710). If an image has not yet been pasted into the block location (NO at S710), the pseudo intraframe generator 404 pastes a shifted intrablock (S711). If an image has already been pasted into the block location (YES at S710), the pseudo intraframe generator 404 does not paste an image. In judging whether an origin block overlaps an intrablock or not, if an origin block does not overlap an intrablock included in Frame n (NO at S708), the pseudo intraframe generator 404 does nothing. The pseudo intraframe generator 404 performs this operation (S707 to S711) on every block that has a motion vector in Frame n+1.

The pseudo intraframe generator 404 checks the image memory and judges whether the generation of a pseudo intraframe has been completed or not, that is, whether all blocks have been pasted or not (S712). If the generation of a pseudo intraframe has not been completed (NO at S712), the pseudo intraframe generator 404 decrements n in order to move the process to data related to the next frame (S705), reads an intra-map and motion vector map of the next frame, and repeats the same process (S706). If the generation of a pseudo intraframe has been completed (YES at S712), the pseudo intraframe generator 404 outputs the pseudo intraframe held in the image memory to the outside of the pseudo intraframe generator 404 (S713).

The above is an example of the pseudo intraframe generation method in the pseudo intraframe generator 404, the method using intra-maps and motion vector maps. Intrablocks are shifted, by using motion vectors, in a plurality of inter-frame compressed moving images accumulated in the media buffer 401, and are then pasted together to generate a pseudo intraframe. A pseudo intraframe that is close to the actual image can be generated by using with priority intrablocks included in temporally new inter-frame compressed moving images.

An example of a pseudo intraframe generation method in the pseudo intraframe generator 404, the method using only motion vector maps, will be described next with reference to FIGS. 9 and 10. For convenience of description, motion vector maps accumulated in the motion vector map memory 403 and corresponding inter-frame compressed moving images are numbered. However, since the pseudo intraframe generation method using only motion vector maps does not use inter-frame compressed moving images other than intraframes, only intraframes are accumulated in the media buffer 401. As in the case of the description of FIG. 6, the numbering is as follows: Let Frame 0 be an intraframe; let Frame n (n is a natural number) be a following frame, and let Motion vector map n (n is a natural number) be a motion vector map related to Frame n; and let Motion vector map N be a latest motion vector map accumulated in the motion vector map memory 403.

Figure 9:
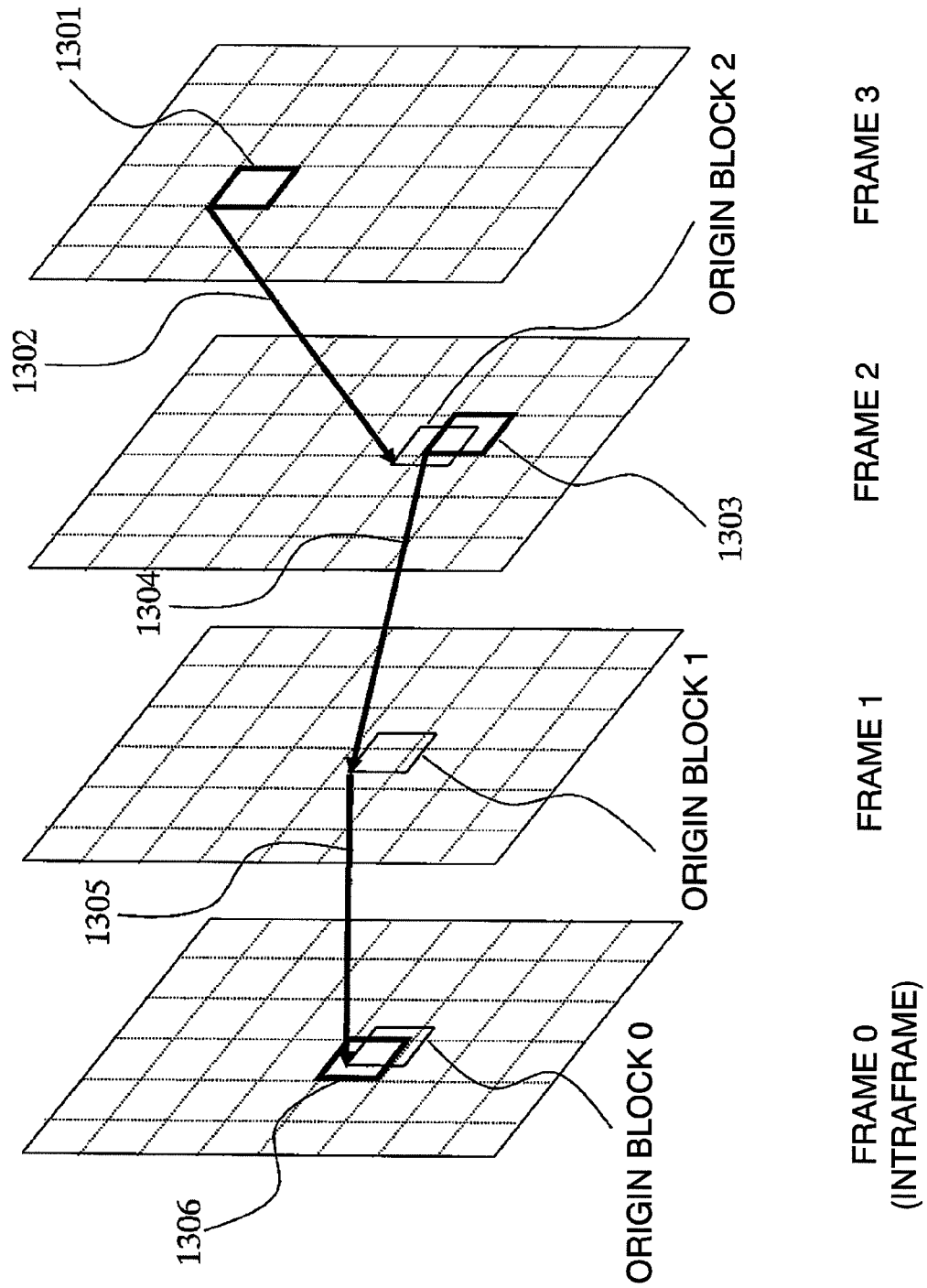
FIG. 9 illustrates a pseudo intraframe generation method in the pseudo intraframe generator of the first embodiment, the method using only motion vector maps.

FIG. 9 illustrates a pseudo intraframe generation method using only motion vector maps. In FIG. 9, let Motion vector map 3 (n=3) be a latest accumulated motion vector map for ease of description, and the pseudo intraframe generation method using only motion vector maps will be described by focusing on an interblock 1301 in Frame 3. Origin block 2 in Frame 2 is determined by using a motion vector 1302 of the interblock 1301. This origin block is the same as an origin block described in FIG. 8. Subsequently, an interblock overlapping an origin block is chosen in Frame 2. If an origin block overlaps a plurality of blocks, one block is chosen from them. A block, for example, having the largest area overlapping an origin block, or the like, may be chosen as the interblock. In this example, an interblock 1303 having the largest area overlapping the origin block is chosen as the next interblock.

Origin block 1 in Frame 1 is determined next from a motion vector 1304 of the interblock 1303. Subsequently, the next interblock is chosen in Frame 1. At this time, there may be a case where all blocks overlapping an origin block are intrablocks. In that case, the origin block itself is regarded as an interblock having a motion vector (0, 0), and let the origin block be the starting point of the motion vector (0, 0). In this example, blocks overlapping Origin block 1 are all intrablocks, and therefore let Origin block 1 be the next interblock. Then, Origin block 0 in Frame 0 is determined from a motion vector 1305 of Origin block 1 regarded as an interblock. Since Frame 0 is an intraframe, an intrablock is chosen instead of an interblock. A block having the largest area overlapping an origin block, or the like, may be chosen as the block. In this example, an intrablock 1306 having the largest area overlapping Origin block 0 is chosen.

The pseudo intraframe generation method using only motion vector maps uses the chosen intrablock 1306 as an intrablock for generating a pseudo intrablock. This intrablock is pasted into the corresponding location in Interframe 3. The same process is performed on every block in Interframe 3 to generate a pseudo intraframe of Frame 3.

Figure 10:
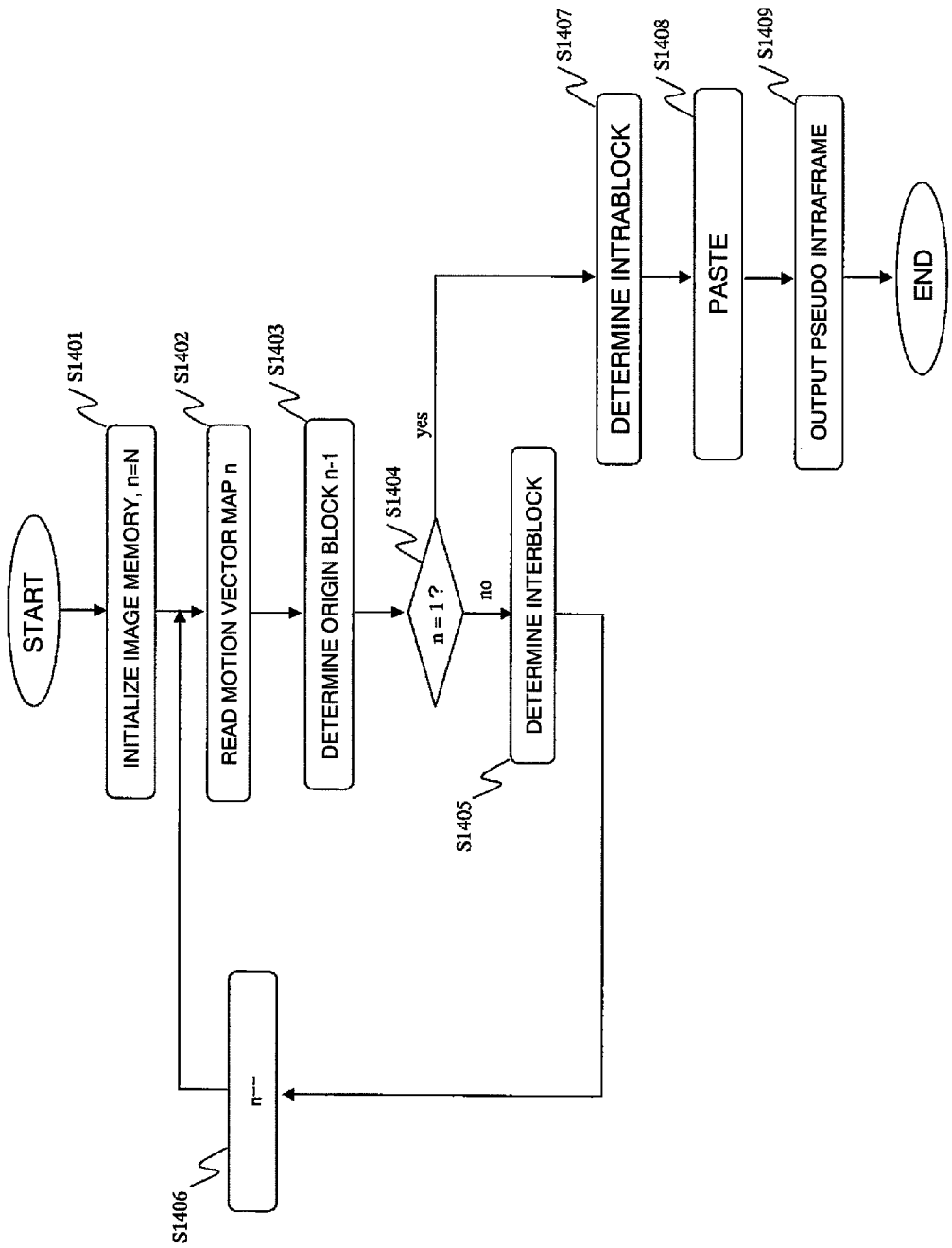
FIG. 10 is a flowchart showing an example of the pseudo intraframe generation method in the pseudo intraframe generator of the first embodiment, the method using only motion vector maps.

FIG. 10 illustrates an operation flow of the pseudo intraframe generator 404. An operation of the pseudo intraframe generator 404 will be described with reference to FIG. 10. The pseudo intraframe generator 404 initializes the image memory, and resets the data number n to N (S1401). The pseudo intraframe generator 404 reads Motion vector map n from the motion vector map memory 403, and performs the following process (S1403 to S1405) on every block in Frame n. An ID is given to each block in Frame n.

If a block in Frame n is an interblock, the pseudo intraframe generator 404 determines Origin block n−1 in Frame n−1 from the interblock's motion vector. If a block is an intrablock or the like that does not have a motion vector, the pseudo intraframe generator 404 regards the block as having a motion vector (0, 0) and determines Origin block n−1. Origin block n−1 inherits the ID of the interblock of Frame n.

The pseudo intraframe generator 404 judges whether n=1 is satisfied or not, that is, whether the frame is an intraframe or not (S1404). If n=1 is not satisfied (NO at S1404), the pseudo intraframe generator 404 determines an interblock that overlaps Origin block n−1 (S1405). An interblock having the largest area overlapping an origin block, or the like, may be chosen as the interblock. If all blocks overlapping an origin block are intrablocks, the origin block itself is regarded as an interblock having a motion vector (0, 0). The determined interblock inherits the ID of Origin block n−1. Completing the process for all blocks in Frame n, the pseudo intraframe generator 404 decrements n in order to move the process to the next frame (S1406).

If n=1 is satisfied (YES at S1404), that is, if the frame is an intraframe, the pseudo intraframe generator 404 determines an intrablock that overlaps Origin block n−1. An intrablock having the largest area overlapping an origin block, or the like, may be chosen as the intrablock. The determined intrablock inherits the ID of Origin block n−1.

Based on an ID inherited by each intrablock in the intraframe (Frame 0), each intrablock having been determined to generate a pseudo intraframe, the pseudo intraframe generator 404 pastes each intrablock into the not shown internal image memory at the same location as a block having the same ID in Frame n (S1408). The pseudo intraframe generator 404 outputs the pseudo intraframe held in the image memory to the outside of the pseudo intraframe generator 404 (S1409).

The above is an example of the pseudo intraframe generation method in the pseudo intraframe generator 404, the method using only motion vector maps. Motion vectors chosen from each frame are linked together block by block by using motion vector maps, so that latest frame's motion vectors can be generated with respect to an intraframe accumulated in the media buffer 401, and a pseudo intraframe can be generated by using the motion vectors.

Using intra-maps and motion vector maps stored in the intra-map memory 402 and motion vector map memory 403, the moving image decoding apparatus 303 of the first embodiment generates a pseudo intraframe from inter-frame compressed moving images stored in the media buffer 401 and uses the pseudo intraframe for decoding a moving image, so that it can decode at an arbitrary timing.

Being equipped with the moving image decoding apparatus 303, the moving image receiving apparatus 103 can start to decode an inter-frame compressed moving image immediately with an interframe and can make screen display without delay when participating at a certain point in a videoconference and when starting to play or switching channels in a digital moving image broadcasting service.

While three pseudo intraframe generation methods in the pseudo intraframe generator 404 have been shown in the embodiment, pseudo intraframe generation methods using intra-maps and motion vector maps are not limited to these methods, but various other variations may be made thereto.

Second Embodiment

A second embodiment will be described next. The second embodiment is a modification based on the pseudo intraframe generation method using intra-maps and motion vector maps which has been described in the first embodiment (hereinafter referred to as the "basic method").

In the second embodiment, images are pasted into the internal image memory of the pseudo intraframe generator 404 in partial blocks that are smaller than blocks. While in the basic method described in the first embodiment the intrablock 804 overlapping an origin block is pasted as it is into the internal image memory, only a part at which the intrablock 804 overlapping an origin block actually overlaps the origin block is pasted in the second embodiment.

Figure 11:
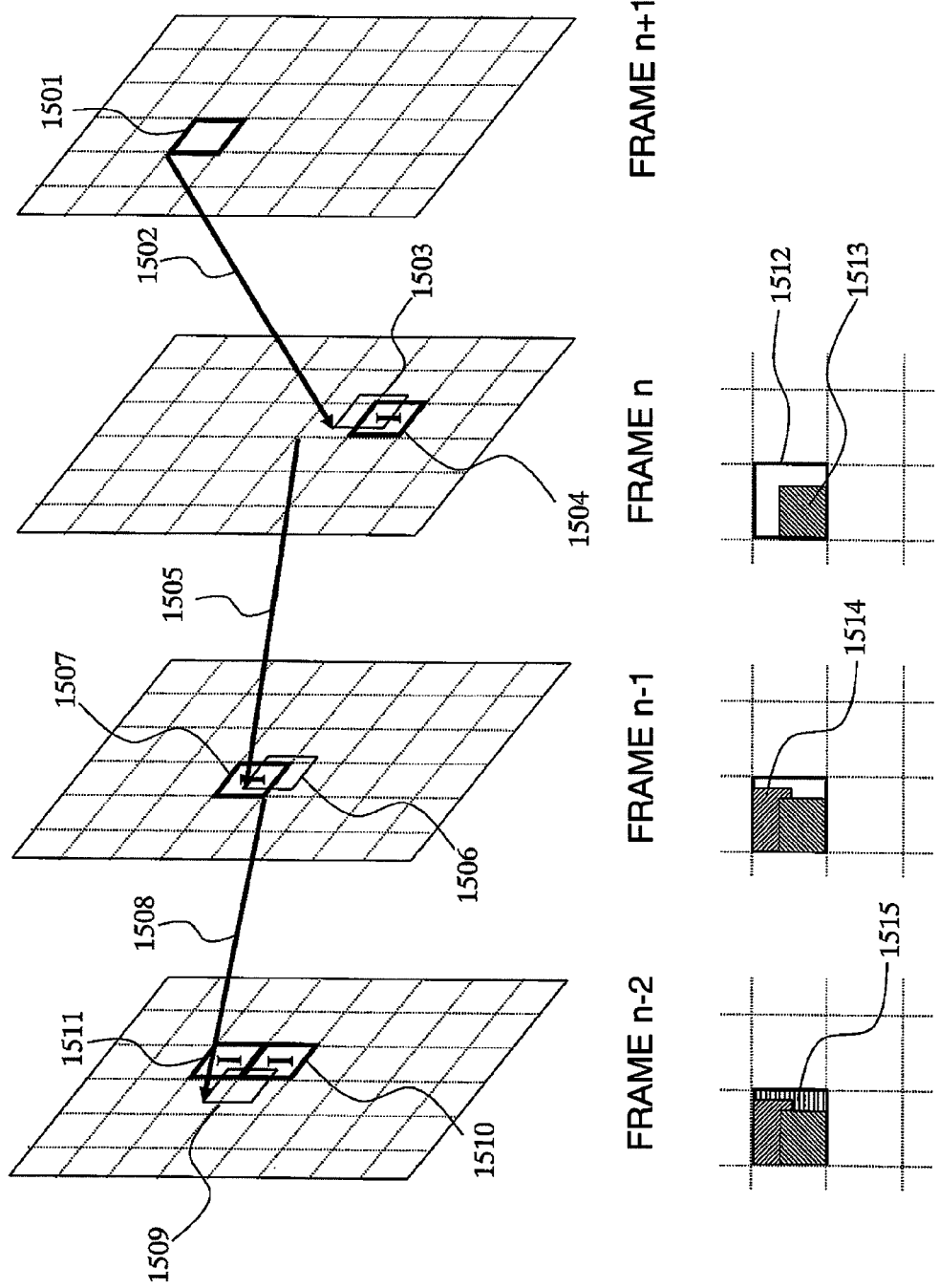
FIG. 11 illustrates a pseudo intraframe generation method in a pseudo intraframe generator of a second embodiment, the method using intra-maps and motion vector maps.

FIG. 11 illustrates the pseudo intraframe generation method in the second embodiment. The upper row of FIG. 11 shows each frame, motion vectors, origin blocks, and intrablocks overlapping origin blocks. The numbering of frames is the same as in the case of FIG. 8. The lower row of FIG. 11 partly shows the state of the internal image memory of the pseudo intraframe generator 404 after each frame has been processed. Here, an interblock 1501 in Frame n+1 is focused on for ease of description, and how an image to be pasted into an internal memory 1512 corresponding to the block location of the interblock 1501 is generated will be described.

An origin block 1503 is determined in Frame n from a motion vector 1502 of the interblock 1501. An intrablock overlapping the origin block 1503 is only an intrablock 1504, and therefore a partial block 1513 at which the origin block 1503 overlaps the intrablock 1504 is cut out of the intrablock 1504 and pasted into the internal memory 1512. At this time, the partial block 1513 is pasted into the same location where the partial block 1513 occupies in the origin block 1503.

A motion vector 1505 of an interblock having the largest area overlapping the origin block 1503 in Frame n is used at transition to the process for Frame n−1. An origin block 1506 is determined in Frame n−1 from the motion vector 1505. An intrablock overlapping the origin block 1506 is only an intrablock 1507, and therefore a partial block at which the origin block 1506 overlaps the intrablock 1507 is cut out of the intrablock 1507. When the cut out partial block is pasted into the internal memory 1512, it is pasted only into an empty part in the internal memory 1512 so that it does not overwrite the already pasted partial block 1513. As a result, an L-shaped partial block 1514 obtained by subtracting the partial block 1513 from the partial block will be pasted.

A motion vector 1508 of an interblock having the largest area overlapping the origin block 1506 in Frame n−1 is used at transition to the process for Frame n−2. An origin block 1509 is determined in Frame n−2 from the motion vector 1508. Intrablocks overlapping the origin block 1509 are intrablocks 1510 and 1511, and therefore a partial block at which the origin block 1509 overlaps the intrablocks 1510 and 1511 is cut out of the intrablocks 1510 and 1511. When the cut out partial block is pasted into the internal memory 1512, it is pasted only into an empty part in the internal memory 1512 so that it does not overwrite the already pasted partial blocks 1513 and 1514. As a result, an L-shaped partial block 1515 will be pasted. Now, with the partial block 1515 pasted, the empty space in the internal memory 1512 corresponding to the block location of the interblock 1501 is entirely filled. When the space in the interblock 1501 is entirely filled, the pseudo intrablock generation process for the interblock 1501 is completed.

The pseudo intraframe generator 404 of the second embodiment shifts intrablocks in partial blocks for every interblock in Frame n+1 and then pastes them together, thereby generating a pseudo intraframe. An image at the location of an origin block can be used as it is. In addition, a pseudo intraframe that is closer to the actual image can be generated by using with priority intrablocks included in temporally new inter-frame compressed moving images.

As a variation of the second embodiment, images to be pasted into the internal image memory of the pseudo intraframe generator 404 may be processed in partial blocks that are smaller than blocks. While in FIG. 11 the motion vector 1505 of the interblock having the largest area overlapping the origin block 1503 in Frame n is used at transition to the process for Frame n−1, the variation uses an average motion vector of motion vectors of three interblocks other than the intrablock 1504 that overlap the origin block 1503. At the same time, let the origin block 1503 be the starting point of the motion vector. Other processes are completely the same as those of the pseudo intraframe generation method of the second embodiment.

In the variation of the second embodiment, the moving vector choosing method at transition to the process for a next frame may use a weighted average motion vector of motion vectors of three interblocks other than the intrablock 1504 that overlap the origin block 1503, the weighted average motion vector being in accordance with the areas overlapping the origin block 1503. At the same time, let the origin block 1503 be the starting point of the motion vector. Other processes are completely the same as those of the pseudo intraframe generation method of the second embodiment.

While up to this point the pseudo intraframe generation method using intra-maps and motion vector maps (the basic method) has been described with the second embodiment and the variation thereof, the invention is not limited to the above method but can be implemented in various other aspects.

Third Embodiment

Figure 12:
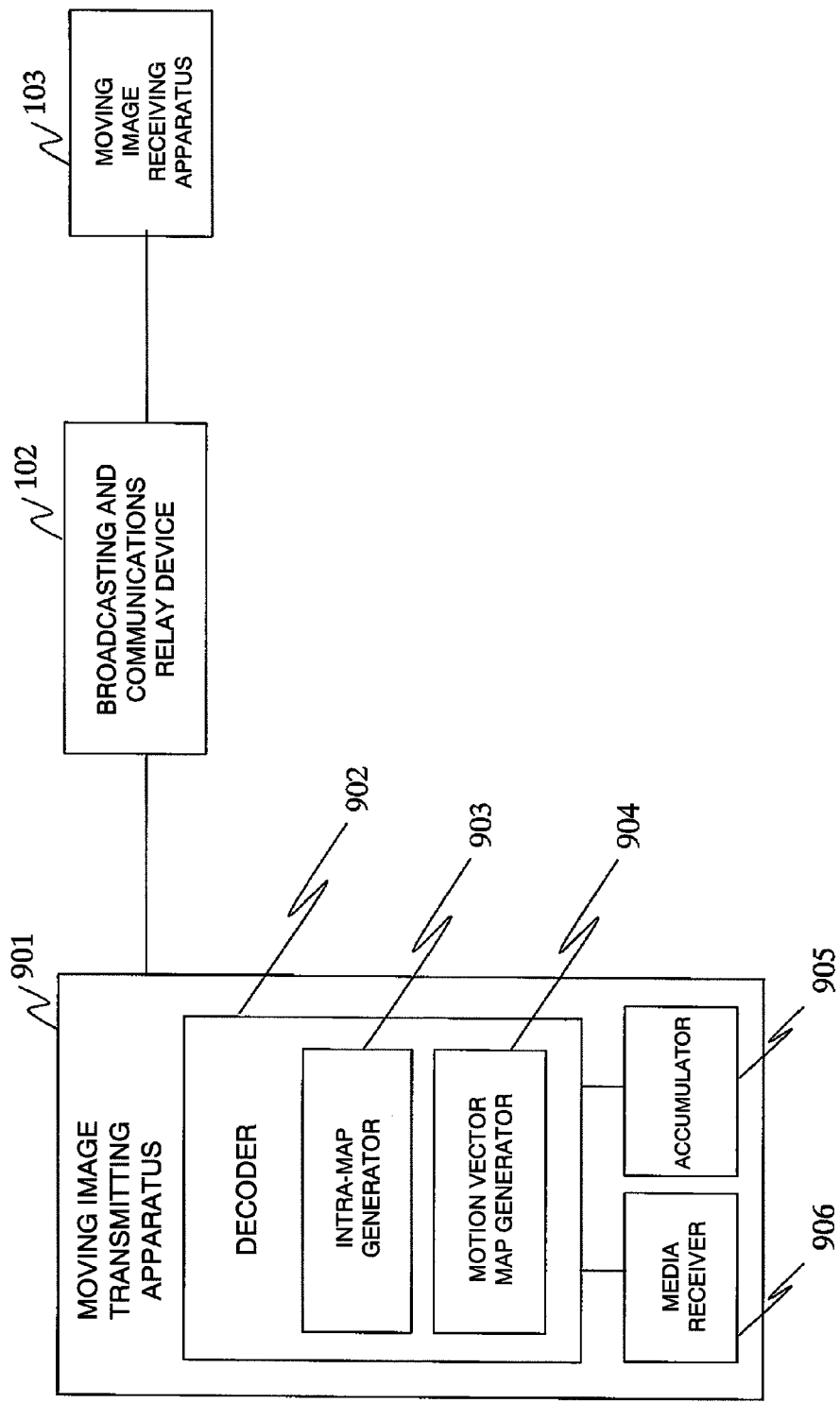
FIG. 12 is a block diagram showing a configuration of a moving image transmitting and receiving system related to a moving image decoding apparatus of a third embodiment.

FIG. 12 shows a configuration of a moving image transmitting and receiving system related to a moving image decoding apparatus of a third embodiment of the invention. The moving image transmitting and receiving system of the third embodiment comprises: a moving image transmitting apparatus 901 for transmitting an inter-frame compressed moving image; a broadcasting and communications relay device 102 that is a data transmission medium; and a moving image receiving apparatus 103 that receives a transmitted inter-frame compressed moving image and displays it on an output device such as a display. The broadcasting and communications relay device 102 and the moving image receiving apparatus 103 are the same as those described in the first embodiment. The moving image transmitting apparatus 901 of the third embodiment is different from that of the first embodiment in the configuration and operation.

In the first embodiment, the moving image transmitting apparatus 101 is equipped with an encoder, and generates an intra-map and a motion vector map when encoding an inter-frame compressed image. In contrast to that, the moving image transmitting apparatus 901 of the present embodiment is equipped with a decoder, and generates an intra-map and a motion vector map when decoding an inter-frame compressed image. In a case where the moving image transmitting apparatus 901 transmits an inter-frame compressed moving image accumulated therein to the moving image receiving apparatus 103, and also in a case where the moving image transmitting apparatus 901 temporarily receives an inter-frame compressed moving image transmitted by a third party and transfers it to the moving image receiving apparatus 103, the moving image transmitting apparatus 901 of the embodiment can generate an intra-map and a motion vector map and transmit them with the inter-frame compressed moving image. As a result, if the broadcasting and communications relay device 102, for example, is a personal area network (PAN) using a short range radio, a mobile viewer corresponding to the moving image transmitting apparatus 901 can receive and decode an inter-frame compressed moving image transmitted from a moving image server on the Internet, can display it on a display of the mobile viewer, and at the same time can transfer an intra-map and a motion vector map as well as the inter-frame compressed moving image over the PAN to a nearby digital television corresponding to the moving image receiving apparatus 103, where the image can immediately be played.

A configuration and operation of the moving image transmitting apparatus 901 of the embodiment will be described next. The moving image transmitting apparatus 901 has a decoder 902 for decoding an inter-frame compressed moving image. The decoder 902 comprises an intra-map generator 903 and a motion vector map generator 904, which frame by frame generate an intra-map and a motion vector map when decoding each frame of an inter-frame compressed moving image. An intra-map and a motion vector map to be generated here are the same as an intra-map and a motion vector map described in the first embodiment. The moving image transmitting apparatus 901 has an accumulator 905, such as a hard disk and a DVD, for providing the decoder 902 with an inter-frame compressed moving image, or has a media receiver 906.

Using the decoder 902, the moving image transmitting apparatus 901 decodes an inter-frame compressed moving image accumulated in the accumulator 905 or an inter-frame compressed moving image transmitted from the outside and received by the media receiver 906, and plays the image using a not shown display unit. When decoding each frame of an inter-frame compressed moving image, the intra-map generator 903 and motion vector map generator 904 in the decoder 902 frame by frame generates an intra-map and a motion vector map. The moving image transmitting apparatus 901 has a not shown network transmitter, and sends an inter-frame compressed moving image acquired from the accumulator 905 or from the media receiver 906 to the moving image receiving apparatus 103. When transmitting an inter-frame compressed moving image, the moving image transmitting apparatus 901 transmits with the image an intra-map generated by the intra-map generator 903 and a motion vector map generated by the motion vector map generator 904. As a result, the moving image receiving apparatus 103 receives an intra-map and a motion vector map in synchronization with an inter-frame compressed moving image and, using them, can immediately start to decode with an interframe.

As described above, the moving image transmitting apparatus 901 of the embodiment has the decoder 902, generates an intra-map and a motion vector map when decoding, and transmits them. Being equipped with the same moving image decoding apparatus 303 as the first embodiment, the moving image receiving apparatus 103 can start to decode an inter-frame compressed moving image immediately with an inter-frame and can make screen display without delay when participating at a certain point in a videoconference and when starting to play or switching channels in a digital moving image broadcasting service.

Fourth Embodiment

Figure 13:
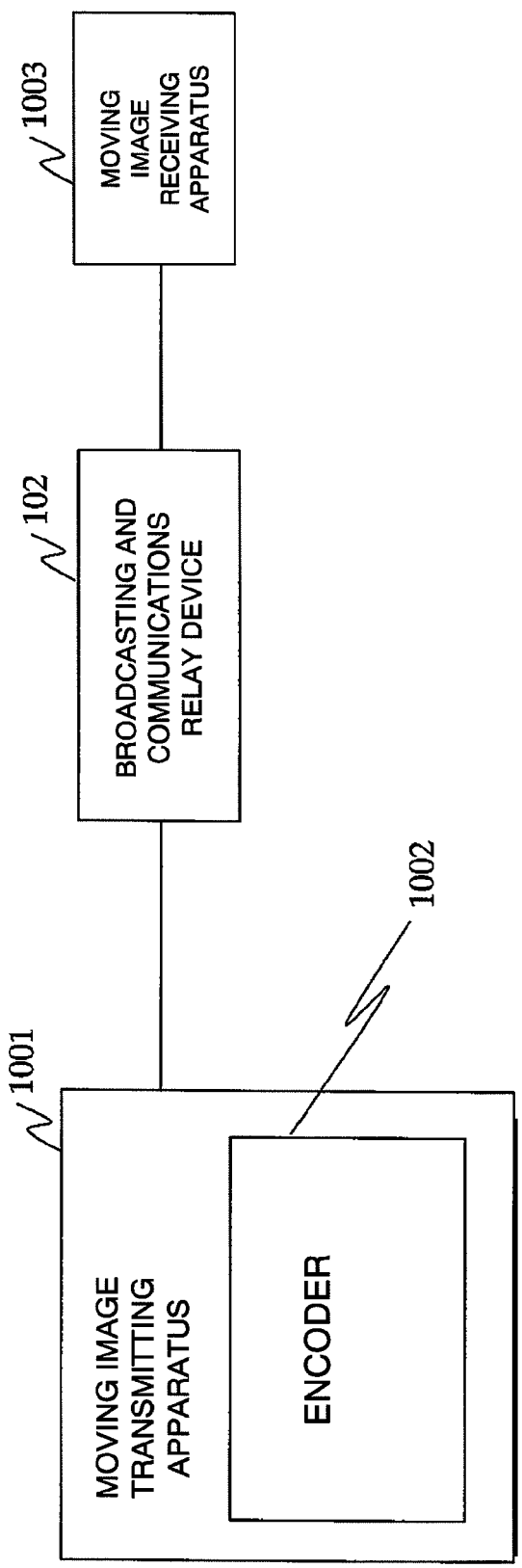
FIG. 13 is a block diagram showing a configuration of a moving image transmitting and receiving system related to a moving image decoding apparatus of a fourth embodiment.

FIG. 13 shows a configuration of a moving image transmitting and receiving system related to a moving image decoding apparatus of a fourth embodiment. The moving image transmitting and receiving system of the fourth embodiment comprises: a moving image transmitting apparatus 1001 for transmitting an inter-frame compressed moving image; a broadcasting and communications relay device 102 that is a data transmission medium; and a moving image receiving apparatus 1003 that receives a transmitted inter-frame compressed moving image and displays it on an output device such as a display. The broadcasting and communications relay device 102 is the same as that of the first embodiment, and the moving image transmitting apparatus 1001 and the moving image receiving apparatus 1003 are different from those of the first embodiment in the configurations and operations.

The moving image transmitting apparatus 101 of the first embodiment is equipped with the encoder 104 that includes the intra-map generator 105 and the motion vector map generator 106, and generates an intra-map and a motion vector map when encoding an inter-frame compressed image. In contrast to that, the moving image transmitting apparatus 1001 of the present embodiment has an encoder 1002 that does not include either an intra-map generator or a motion vector map generator.

The encoder 1002 does not generate either an intra-map or a motion vector map when encoding a moving image, and the moving image transmitting apparatus 1001 of the embodiment does not transmit to the moving image receiving apparatus 1003 either an intra-map or a motion vector map with an inter-frame compressed moving image. In view of either an intra-map or a motion vector map not being transmitted, the moving image receiving apparatus 1003 of the embodiment is equipped with a not shown intra-map generator and a not shown motion vector map generator, and generates an intra-map and a motion vector map from a received inter-frame compressed moving image.

Figure 14:
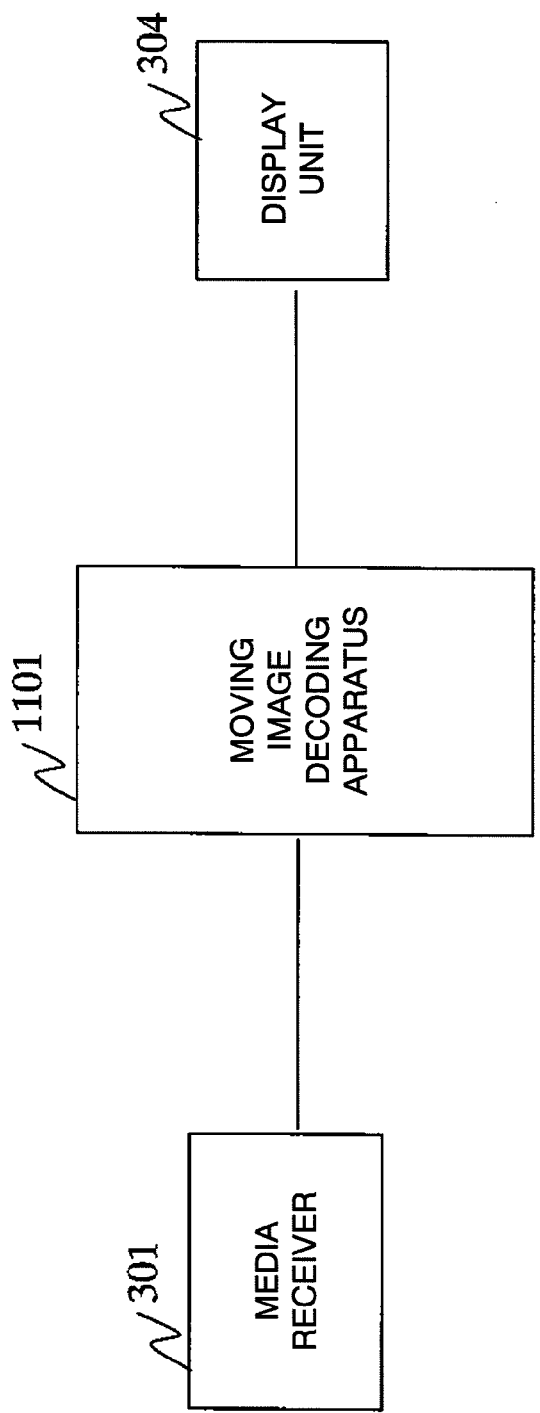
FIG. 14 is a block diagram showing an internal configuration of a moving image receiving apparatus of the moving image transmitting and receiving system of the fourth embodiment.

FIG. 14 shows a configuration of the moving image receiving apparatus 1003. The moving image receiving apparatus 1003 comprises: a media receiver 301 for receiving an inter-frame compressed moving image; a moving image decoding apparatus 1101 that generates and uses an intra-map and a motion vector map to decode an inter-frame compressed moving image received by the media receiver 301 immediately, starting with an interframe; and a display unit 304 for externally outputting an uncompressed moving image decoded by the moving image decoding apparatus 1101. The media receiver 301, which is the same as that of the first embodiment, extracts only inter-frame compressed moving images from transmitted data. The media receiver 301 corresponds to the function of a receiver or tuner in digital broadcasting, and to a socket interface or packet reconstruction function in communications. The media receiver 301 can receive one or a plurality of streams at the same time, and can transmit them to the moving image decoding apparatus 1101. The display unit 304, which is also the same as that of the first embodiment, displays an uncompressed image decoded by the moving image decoding apparatus 1101. The display unit 304 is, for example, a display. With the above configuration, the moving image receiving apparatus 1003 can start to decode a received inter-frame compressed moving image immediately with an interframe.

Figure 15:
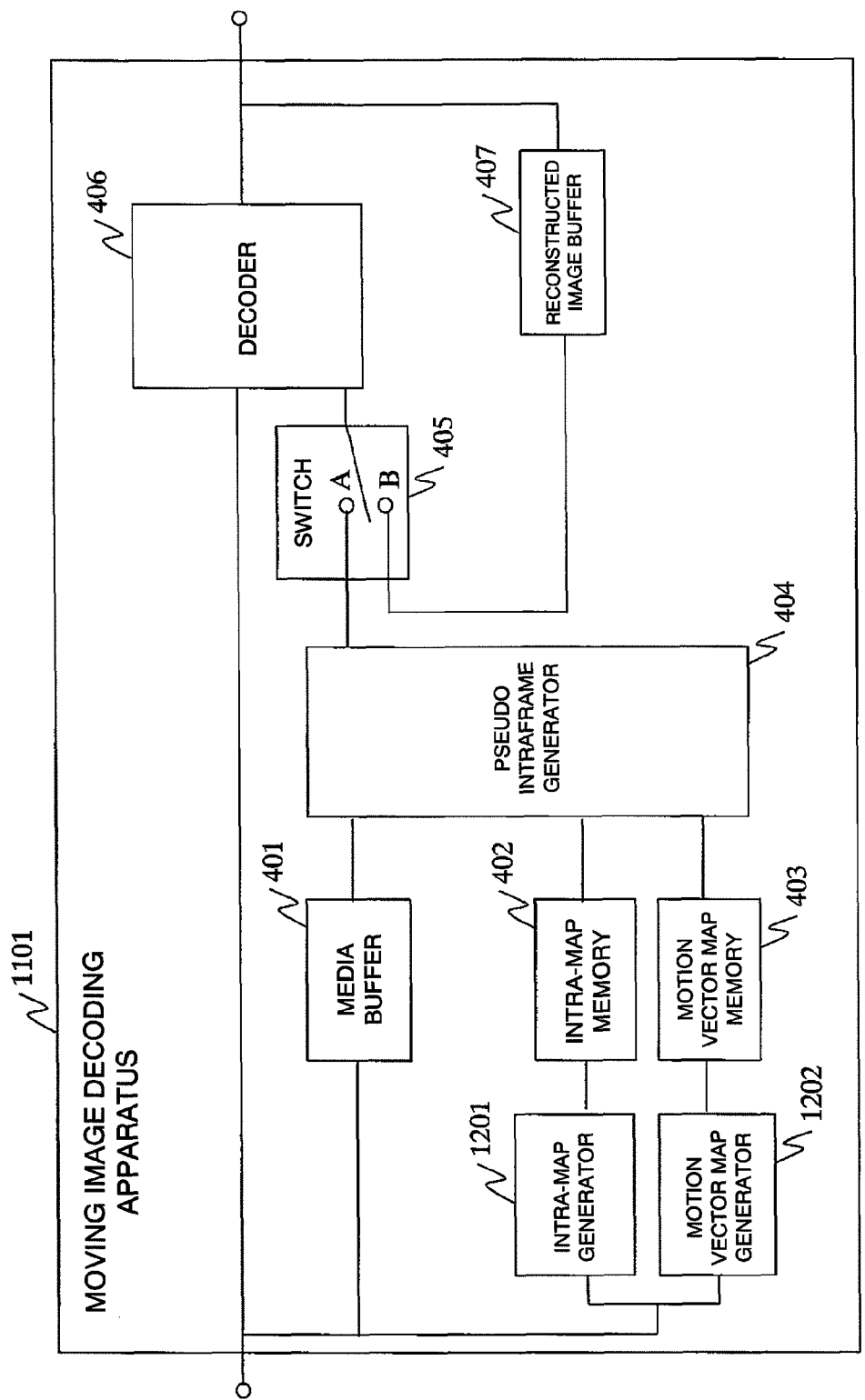
FIG. 15 is a block diagram showing an internal configuration of the moving image decoding apparatus of the fourth embodiment.

FIG. 15 shows a configuration of the moving image decoding apparatus 1101 of the fourth embodiment. The moving image decoding apparatus 1101 has: a media buffer 401 for accumulating a plurality of the latest frames of inter-frame compressed moving images from inter-frame compressed moving images extracted by the media receiver 301; an intra-map generator 1201 and a motion vector map generator 1202 that extract an intrablock and a motion vector from an inter-frame compressed moving image and generate an intra-map and a motion vector map, respectively; and an intra-map memory 402 and a motion vector map memory 403 for storing intra-maps and motion vector maps, respectively, generated by the intra-map generator 1201 and the motion vector map generator 1202.

The moving image decoding apparatus 1101 also has: a pseudo intraframe generator 404 for generating a pseudo intraframe from inter-frame compressed moving images stored in the media buffer 401 based on intra-maps and motion vector maps stored in the intra-map memory 402 and motion vector map memory 403; a decoder 406 for decoding an inter-frame compressed image; a reconstructed image buffer 407 for storing a reconstructed image outputted by the decoder 406, in order to decode the next inter-frame compressed image; and a switch 405 for switching an input for the decoder 406.

A pseudo intraframe generated by the pseudo intraframe generator 404 is an image essential for decoding a latest inter-frame compressed image inputted to the moving image decoding apparatus 1101. A pseudo intraframe corresponds to one decoded from an inter-frame compressed image which is one frame before the latest inter-frame compressed image. The media buffer 401, the intra-map memory 402, and the motion vector map memory 403 can store each data frame by frame, and can access and retrieve each data frame by frame. The reconstructed image buffer 407 holds one frame of uncompressed reconstructed image, and is overwritten when new data is inputted thereto. The decoder 406 is a common decoder that can decode an inter-frame compressed moving image, starting with an intraframe.

Being equipped with the intra-map generator 1201 and the motion vector map generator 1202, the moving image decoding apparatus 1101 can generate intra-maps and motion vector maps that are required for generating a pseudo intraframe from received inter-frame compressed moving images. Generated intra-maps and motion vector maps are stored in the intra-map memory 402 and the motion vector map memory 403, respectively. Other operations are the same as those of the moving image decoding apparatus 303 of the first embodiment.

As described above, even when an intra-map and a motion vector map are not transmitted from the moving image transmitting apparatus 1001, the moving image receiving apparatus 1003 of the embodiment can generate intra-maps and motion vector maps that are required for generating a pseudo intraframe and can immediately start to decode with an interframe, since the moving image decoding apparatus 1101 is equipped with the intra-map generator 1201 and the motion vector map generator 1202.

While there have been described what are at present considered to be preferred embodiments of the invention, it will be understood that various modifications and variations may be made thereto, and it is intended that appended claims cover all such modifications and variations as fall within the true spirit and scope of the invention.

INDUSTRIAL APPLICABILITY

As described above, the invention has a great advantage of being able to start to decode at an arbitrary timing using a pseudo intraframe, and is useful as a moving image decoding apparatus that is applied to a videoconference terminal, a digital television, and the like.

The invention claimed is:

1. A moving image transmitting apparatus comprising:
   a decoder for decoding compressed moving image data comprising a plurality of intraframes and interframes;
   an intra-map generator for generating, based on the compressed moving image data being decoded by the decoder, an intra-map indicating a location of an intrablock in an interframe of the interframes included in the compressed moving image data; and
   a transmitter for transmitting, as different data, the compressed moving image data and the generated intra-map in an uncompressed state to a receiver.

2. The transmitting apparatus according to claim 1, further comprising:
   a motion vector map generator for generating, based on the compressed moving image data being decoded by the decoder, a motion vector map indicating a block-by-block inter-frame motion vector of the moving image.

* * * * *